US010259087B2

(12) United States Patent
Ueda et al.

(10) Patent No.: US 10,259,087 B2
(45) Date of Patent: Apr. 16, 2019

(54) CUTTING DEVICE

(71) Applicant: Roland DG Corporation, Hamamatsu-shi, Shizuoka (JP)

(72) Inventors: Jun Ueda, Hamamatsu (JP); Akihiro Suyama, Hamamatsu (JP); Ryo Sato, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 80 days.

(21) Appl. No.: 15/709,545

(22) Filed: Sep. 20, 2017

(65) Prior Publication Data
US 2018/0079040 A1 Mar. 22, 2018

(30) Foreign Application Priority Data

Sep. 21, 2016 (JP) ................................. 2016-183912
Sep. 21, 2016 (JP) ................................. 2016-183913

(51) Int. Cl.
*B23Q 3/157* (2006.01)
*B23Q 3/155* (2006.01)
*B23Q 17/24* (2006.01)
*G05B 19/00* (2006.01)
*B23C 1/06* (2006.01)
(Continued)

(52) U.S. Cl.
CPC ..... *B23Q 3/15506* (2013.01); *B23Q 3/15536* (2016.11); *B23Q 3/15706* (2013.01); *B23Q 17/2428* (2013.01); *G05B 19/00* (2013.01); *B23C 1/002* (2013.01); *B23C 1/06* (2013.01);
(Continued)

(58) Field of Classification Search
CPC ............ B23Q 3/15506; B23Q 3/15706; B23Q 3/15536; B23Q 17/22; B23Q 17/2428; Y10T 409/30728; Y10T 409/308064; Y10T 409/308624
See application file for complete search history.

(56) References Cited

U.S. PATENT DOCUMENTS 3,171,327 A * 3/1965 Williamson ....... B23Q 3/15706
409/80
3,973,863 A * 8/1976 Smith ................ B23Q 3/15706
483/55
(Continued)

FOREIGN PATENT DOCUMENTS

JP 2013-121466 A 6/2013

*Primary Examiner* — Daniel W Howell
(74) *Attorney, Agent, or Firm* — Keating & Bennett, LLP

(57) ABSTRACT

A controller of a cutting device includes a first reference point detection processor detecting an actual position of a first reference point on a top surface of a first protrusion of a magazine, a second reference point detection processor detecting an actual position of a second reference point on a top surface of the second protrusion of the magazine, a sensor offset calculation processor calculating an offset of an actual position of a tool sensor of the magazine with respect to a designed position of the tool sensor based on the first reference point and the second reference point, a stocker offset calculation processor calculating an offset of an actual position of the stocker of the magazine with respect to a designed position of the stocker based on the first reference point and the second reference point, and a movement control processor controlling a movement mechanism based on the offset of the tool sensor and the offset of the stocker.

11 Claims, 25 Drawing Sheets

(51) Int. Cl.
   *B23C 1/00* (2006.01)
   *B23Q 11/08* (2006.01)
   *B23Q 1/00* (2006.01)

(52) U.S. Cl.
   CPC ........ *B23Q 1/0045* (2013.01); *B23Q 3/15526* (2013.01); *B23Q 11/0891* (2013.01)

(56) References Cited

U.S. PATENT DOCUMENTS

| | | | | |
|---|---|---|---|---|
| 4,000,954 A | * | 1/1977 | Patel ................. | B23Q 3/15706 279/50 |
| 4,088,417 A | * | 5/1978 | Kosmowski ............ | B23B 35/00 408/1 R |
| 4,658,494 A | * | 4/1987 | Ohtani ............... | B23Q 3/15526 408/16 |
| 4,869,626 A | * | 9/1989 | Kosmowski ............ | B23B 31/14 408/129 |
| 2011/0083307 A1 | * | 4/2011 | Shih .................. | B23Q 3/15706 483/56 |
| 2012/0172185 A1 | * | 7/2012 | Yang ................. | B23Q 3/15526 483/13 |
| 2017/0361410 A1 | * | 12/2017 | Sato .................. | B23Q 3/15536 |

* cited by examiner

CUTTING DEVICE

CROSS REFERENCE TO RELATED APPLICATIONS

This application claims the benefit of priority to Japanese Patent Application No. 2016-183912 filed on Sep. 21, 2016 and Japanese Patent Application No. 2016-183913 filed on Sep. 21, 2016. The entire contents of these applications are hereby incorporated herein by reference.

BACKGROUND OF THE INVENTION

1. Field of the Invention

The present invention relates to a cutting device.

2. Description of the Related Art

Conventionally, a cutting device that cuts a processing target with a rotatable cutting tool is known. As this type of cutting device, Japanese Laid-Open Patent Publication No. 2013-121466, for example, discloses a cutting device including a cutter that cuts a processing target and a holder that holds the processing target.

This type of cutting device also includes a movement mechanism that moves the cutter three-dimensionally with respect to the holder. The positional relationship between the processing target held by the holder and the cutter is changed three-dimensionally by the movement mechanism, so that a portion of the processing target that is to be cut by the cutter is optionally changed. As a result, the processing target is cut into a desired shape.

The cutter of this type of cutting device includes a grasper that grasps the processing tool. This type of cutting device includes a magazine including stockers that respectively accommodate a plurality of the processing tools. The processing tool accommodated in either one of the stockers is grasped by the grasper, and the processing tool grasped by the grasper is used to cut the processing target.

However, if the magazine is located slightly shifted from a proper position with respect to a main body of the cutting device and thus there is an assembling error of the magazine with respect to the main body of the cutting device, the processing tool accommodated in the stocker may not be properly grasped by the grasper. If the processing target is cut in the state where the grasper does not grasp the processing tool properly, the processing target may not be cut into a desired shape.

SUMMARY OF THE INVENTION

Preferred embodiments of the present invention provide cutting devices that significantly reduce or prevent a situation where a processing target is not cut into a desired shape due to an assembling error of a magazine.

A cutting device according to a preferred embodiment of the present invention includes a main body, a cutting head, a magazine, a movement mechanism, and a controller. The cutting head includes a grasper capable of grasping either a processing tool or a detection tool. The magazine is provided in the main body. The magazine includes a magazine main body, a stocker, a tool sensor, a first protrusion and a second protrusion. The stocker accommodates either the processing tool or the detection tool. The tool sensor is provided in the magazine main body, and detects either the processing tool or the detection tool that is grasped by the grasper. The first protrusion and the second protrusion are provided on a top surface of the magazine main body. The movement mechanism moves the grasper three-dimensionally with respect to the magazine. The controller controls the movement mechanism. The controller includes a first reference point detection processor, a second reference point detection processor, a sensor offset calculation processor, a stocker offset calculation processor, and a movement control processor. The first reference point detection processor controls the movement mechanism such that the detection tool grasped by the grasper contacts the first protrusion, and thus detects an actual position of a first reference point, which is a center point of a top surface of the first protrusion. The second reference point detection processor controls the movement mechanism such that the detection tool grasped by the grasper contacts the second protrusion, and thus detects an actual position of a second reference point, which is a center point of a top surface of the second protrusion. The sensor offset calculation processor calculates a sensor offset, which is a correction value on an actual position of the tool sensor with respect to a designed position of the tool sensor, based on the first reference point and the second reference point. The stocker offset calculation processor calculates a stocker offset, which is a correction value on an actual position of the stocker with respect to a designed position of the stocker, based on the first reference point and the second reference point. The movement control processor controls the movement mechanism based on the sensor offset and the stocker offset.

With the above-described cutting device, the actual position of the first reference point on the top surface of the first protrusion provided on the magazine main body of the magazine, and the actual position of the second reference point on the top surface of the second protrusion provided on the magazine main body, are detected. From the two points, namely, from the first reference point and the second reference point, the inclination of the magazine main body is obtained. Therefore, an assembling error of the magazine main body is calculated, and also the sensor offset and the stocker offset are calculated, from the first reference point and the second reference point. Thus, to perform cutting, the movement mechanism is controlled in consideration of the sensor offset, so that the processing tool grasped by the grasper is properly detected by the tool sensor. To perform cutting, the movement mechanism is controlled in consideration of the stocker offset, so that the processing tool accommodated in the stocker is properly grasped by the grasper and also the processing tool grasped by the grasper is properly accommodated in the stocker. Since the grasper grasps the processing tool at an appropriate position, the processing target is cut into a desired shape even if an assembling error of the magazine occurs.

According to preferred embodiments of the present invention, cutting devices significantly reduce or prevent a situation where the processing target is not cut into a desired shape due to an assembling error of the magazine.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, cutting devices according to preferred embodiments of the present invention will be described. The preferred embodiments described below are not intended to specifically limit the present invention. Components and portions that have the same functions will bear the same reference signs, and overlapping descriptions will be omitted or simplified optionally.

Preferred Embodiment 1

Figure 1:
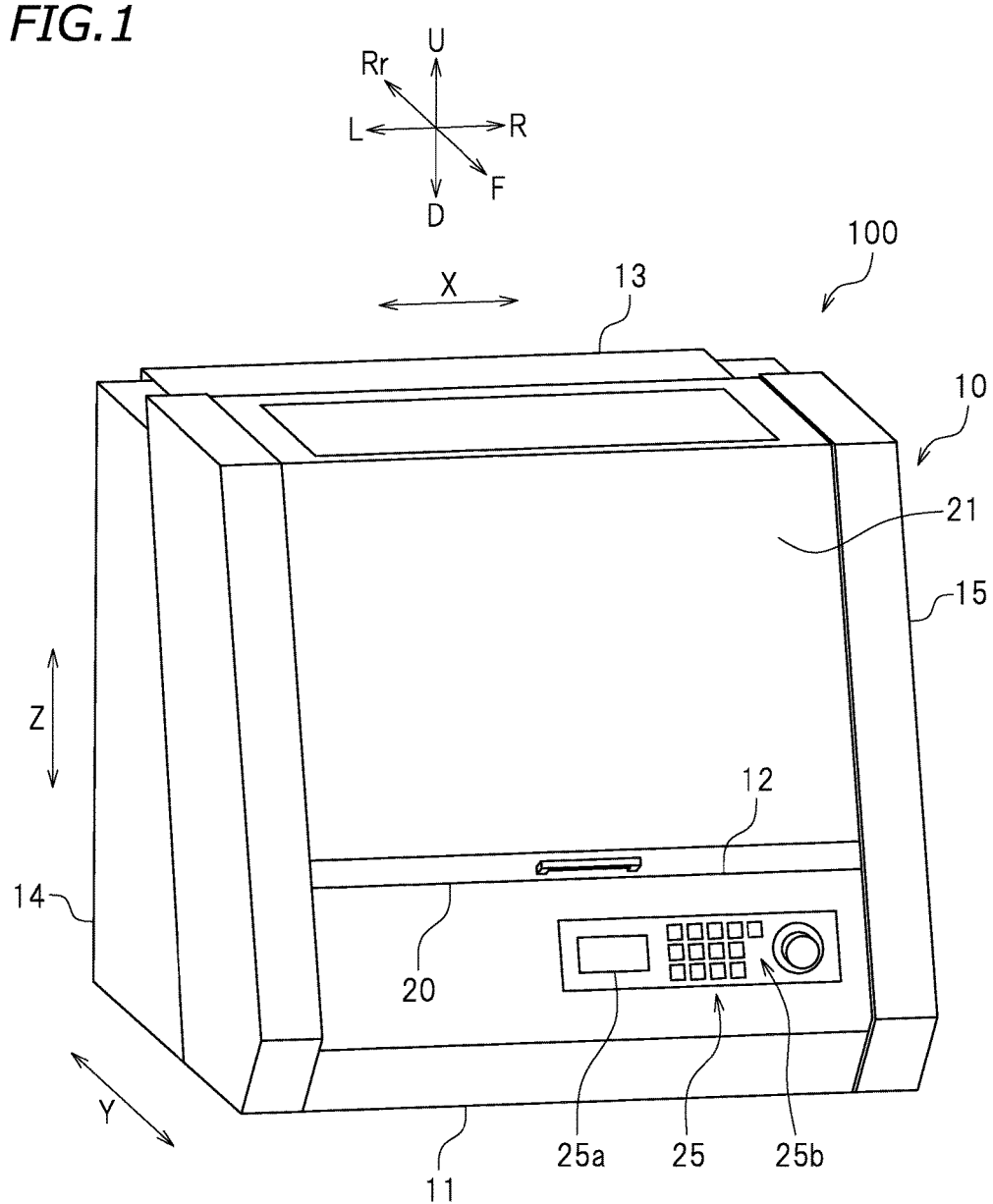
FIG. 1 is a perspective view of a cutting device in preferred embodiment 1 of the present invention.
Figure 2:
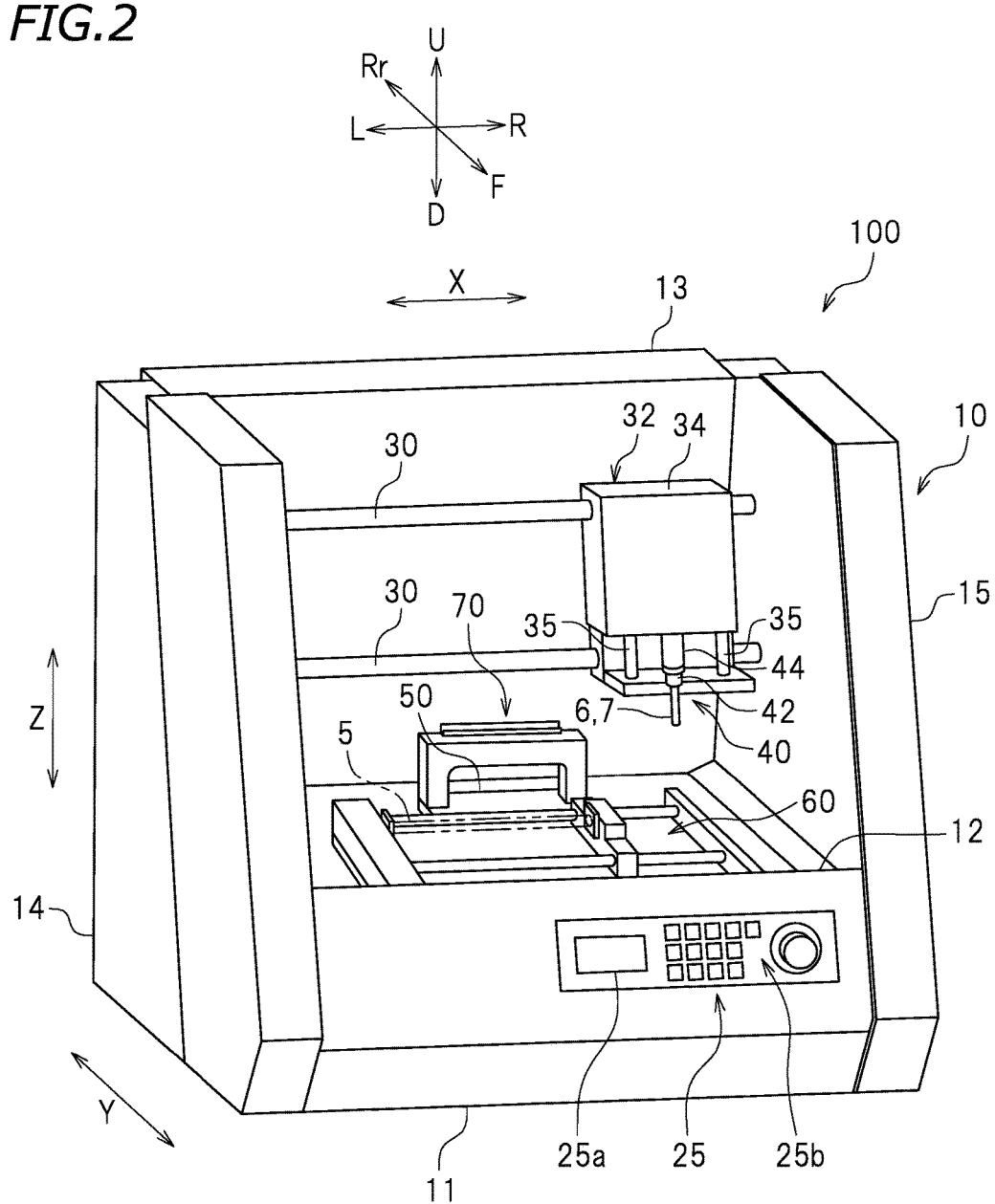
FIG. 2 is a perspective view of the cutting device with a front cover being omitted.

FIG. 1 is a perspective view of a cutting device 100 according to preferred embodiment 1 of the present invention. FIG. 2 is a perspective view of the cutting device 100 with a front cover 20 being omitted. In the following description, the side of the cutting device 100 closer to a user facing the cutting device 100 shown in FIG. 1 will be referred to as "front", and the side of the cutting device 100 farther from the user facing the cutting device 100 shown in in FIG. 1 will be referred to as "rear". The terms "left", "right", "up" and "down" respectively refer to left, right, up and down as seen from the user facing a front surface of the cutting device 100. In the drawings, the letters F, Rr, L, R, U and D respectively refer to front, rear, left, right, up and down. These directions are defined merely for the sake of convenience, and do not limit the manner of installation of the cutting device 100 in any way, or do not limit the present invention in any way. In the drawings, the letter "X" refers to a left-right direction, the letter "Y" refers to a front-rear direction, and the letter "Z" refers to an up-down direction. In this specification, positions of components and the like included in the cutting device 100 are represented by a coordinate in an XYZ orthogonal coordinate system. Herein, the left-right direction X is an X-axis direction. The left side in FIG. 1 is the negative side of the X-axis direction, and the right side in FIG. 1 is the positive side of the X-axis direction. The front-rear direction Y is a Y-axis direction. The front side in FIG. 1 is the negative side of the Y-axis direction, and the rear side in FIG. 1 is the positive side of the Y-axis direction. The up-down direction Z is a Z-axis direction. The lower side in FIG. 1 is the negative side of the Z-axis direction, and the upper side in FIG. 1 is the positive side of the Z-axis direction. There is no specific limitation on the X-axis direction, the Y-axis direction or the Z-axis direction, and the X-axis direction, the Y-axis direction and the Z-axis direction may be appropriately set in accordance with the form of the cutting device 100.

As shown in FIG. 2, the cutting device 100 rotates a processing tool 6 to cut a processing target 5, which is a target of cutting. In this preferred embodiment, the cutting device 100 is box-shaped. As shown in FIG. 1, the cutting device 100 includes a main body 10, the front cover 20, and an operation panel 25. As shown in FIG. 2, the main body 10 is provided with an inner space. The main body 10 has a front opening. In this preferred embodiment, the main body 10 includes a base portion 11, a front wall 12, a rear wall 13, a left wall 14, and a right wall 15. The base portion 11 is a plate-shaped member. The front wall 12 extends upward from a front end of the base portion 11. The rear wall 13 extends upward from a rear end of the base portion 11. The left wall 14 extends upward from a left end of the base portion 11. A bottom portion of a front end of the left wall 14 is connected with a left end of the front wall 12. A rear end of the left wall 14 is connected with a left end of the rear wall 13. The right wall 15 extends upward from a right end of the base portion 11. A bottom portion of a front end of the right wall 15 is connected with a right end of the front wall 12. A rear end of the right wall 15 is connected with a right end of the rear wall 13.

As shown in FIG. 1, the front cover 20 is provided to freely open or close the front opening of the main body 10. For example, the front cover 20 is supported by the main body 10 such that a rear end of the front cover 20 is rotatable about an axis. The front cover 20 may include a window 21, through which the inside of the main body 10 is visible from outside. The window 21 is preferably defined by, for example, a transparent acrylic plate.

The operation panel 25 is usable by the user to make an operation on cutting or the like. The operation panel 25 is provided on the front wall 12. The operation panel 25 includes a display 25a displaying information on cutting, for example, the time required for the cutting, the cutting state and the like, and also includes an input portion 25b usable by the user to input information on the cutting.

Now, an internal structure of the cutting device 100 will be described. As shown in FIG. 2, the cutting device 100 includes a pair of first guide rails 30, a carriage 32, a cutting head 40, a table 50, a rotation mechanism 60, a magazine 70, and a controller 80 (see FIG. 7).

The pair of first guide rails 30 guide the cutting head 40 in the left-right direction X. In this preferred embodiment, two first guide rails 30 are located in the main body 10. The pair of first guide rails 30 are arrayed in the up-down direction Z, and extend in the left-right direction X. Left ends of the pair of first guide rails 30 are connected with the left wall 14. Right ends of the pair of first guide rails 30 are connected with the right wall 15. There is no specific limitation on the number of the first guide rail(s) 30. For example, one first guide rail 30 may be provided.

The carriage 32 is slidable with respect to the pair of first guide rails 30. The carriage 32 is engaged with the pair of first guide rails 30. The carriage 32 is movable in the left-right direction X along the pair of first guide rails 30. In this preferred embodiment, the carriage 32 is connected with a first motor 32A (see FIG. 7). Upon receipt of a driving force of the first motor 32A, the carriage 32 moves in the left-right direction X.

Figure 7:
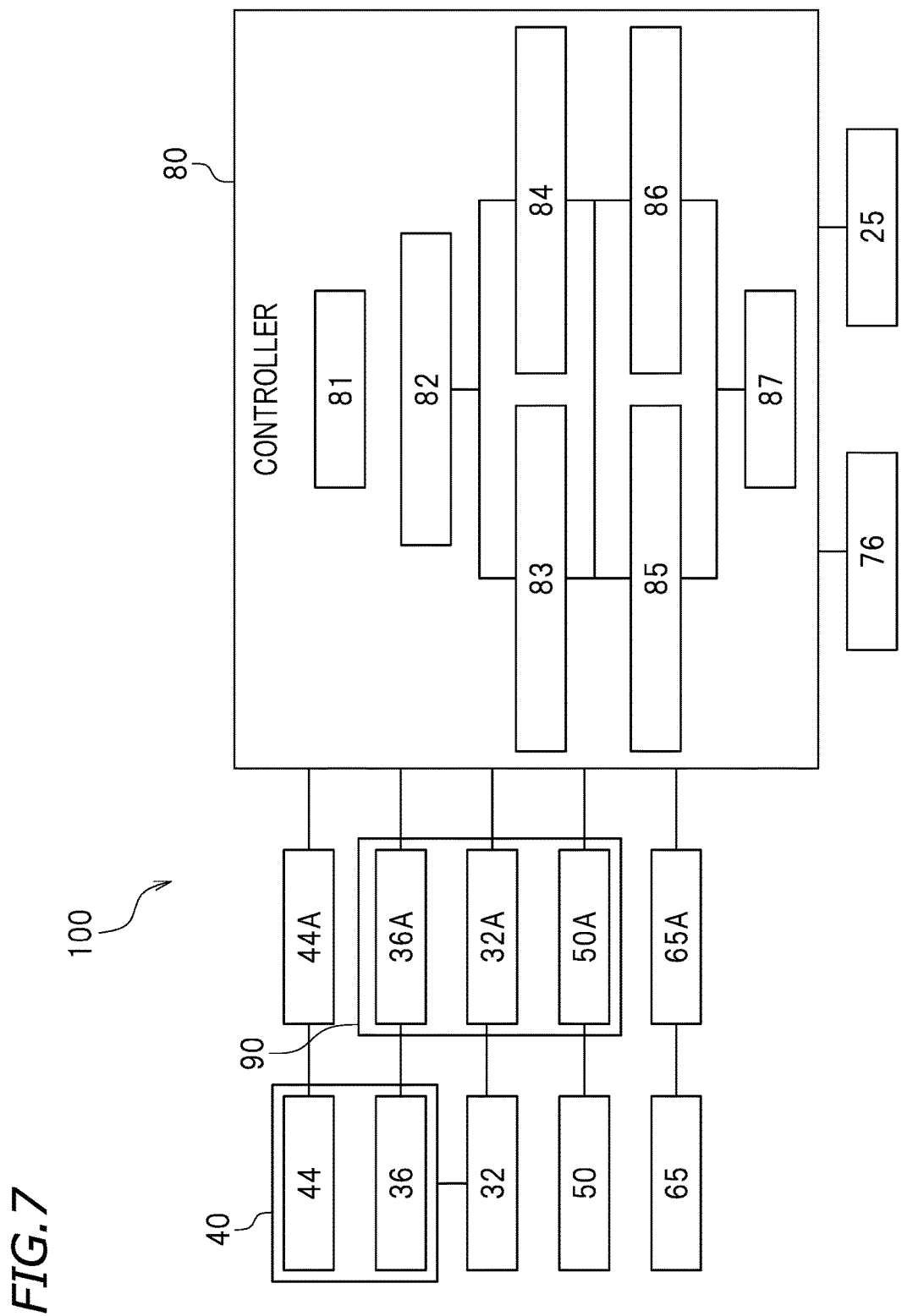
FIG. 7 is a block diagram of the cutting device.

In this preferred embodiment, the carriage 32 includes a carriage case 34, a pair of second guide rails 35, and a slidable member 36 (see FIG. 7). The carriage case 34 is engaged with the pair of first guide rails 30. The carriage case 34 is provided with an inner space. The pair of second guide rails 35 are components extending in the up-down direction Z, and are provided in the inner space of the carriage case 34. The slidable member 36 shown in FIG. 7 is engaged with the pair of second guide rails 35 although the engagement state is not shown. The slidable member 36 is movable in the up-down direction Z along the pair of second guide rails 35. In this preferred embodiment, as shown in FIG. 7, the slidable member 36 is connected with a second motor 36A. Upon receipt of a driving force of the second motor 36A, the slidable member 36 moves in the up-down direction Z. The slidable member 36 is provided with the cutting head 40 although how the slidable member 36 is provided with the cutting head 40 is not shown.

As shown in FIG. 2, the cutting head 40 uses the processing tool 6 to cut the processing target 5. The cutting head 40 uses a detection tool 7 to detect an actual position of the magazine 70. In this preferred embodiment, the processing tool 6 is used to cut the processing target 5. Although not shown, the processing tool 6 incudes a blade in a bottom portion thereof. The detection tool 7 detects positions of components of the cutting device 100, such as the magazine 70 and the like. The detection tool 7 does not include a blade or the like in a bottom portion thereof, and has a smooth bottom surface.

Along with the movement of the carriage 32 in the left-right direction X, the cutting head 40 moves in the left-right direction X along the pair of first guide rails 30. Along with the movement of the slidable member 36 (see FIG. 7) in the up-down direction Z, the cutting head 40 moves in the up-down direction Z along the pair of second guide rails 35. In this preferred embodiment, the cutting head 40 includes a grasper 42 and a spindle 44.

The grasper 42 is capable of grasping either the processing tool 6 or the detection tool 7. In this example, the grasper 42 includes a pair of members arrayed in a horizontal direction although such members are not shown. The grasper 42 holds a top end of the processing tool 6 or the detection tool 7 with the plurality of members to grasp the processing tool 6 or the detection tool 7. In this preferred embodiment, the spindle 44 is provided at a top end of the grasper 42.

The spindle 44 rotates either the processing tool 6 or the detection tool 7 that is grasped by the grasper 42. In more detail, the spindle 44 rotates the grasper 42 to rotate, about a rotation axis, either the processing tool 6 or the detection tool 7 that is grasped by the grasper 42. In this example, the rotation axis extends in the up-down direction Z, namely, in the Z-axis direction. In this preferred embodiment, the spindle 44 is connected with a third motor 44A (see FIG. 7) rotating the spindle 44. Upon receipt of a driving force of the third motor 44A, the spindle 44 rotates. Along with the rotation of the spindle 44, either the processing tool 6 or the detection tool 7 that is grasped by the grasper 42 is rotated. The spindle 44 is provided on the slidable member 36 (see FIG. 7) slidably provided on the pair of second guide rails 35 although how the spindle 44 is provided on the slidable member 36 is not shown. The spindle 44 is rotatable with respect to the slidable member 36. In this example, along with the movement of the slidable member 36 in the up-down direction Z, the grasper 42 of the cutting head 40, either the processing tool 6 or the detection tool 7 that is grasped by the grasper 42, and the spindle 44 move in the up-down direction Z.

The rotation mechanism 60 is provided on the table 50. The magazine 70 is provided on the table 50. The table 50 is located inside the main body 10. The table 50 is located below the cutting head 40.

In this preferred embodiment, the table 50 is movable in the front-rear direction Y. Although not shown, a pair of rails extending in the front-rear direction Y are provided in the base portion 11. The table 50 is slidable with respect to the pair of rails. In this preferred embodiment, as shown in FIG. 7, the table 50 is connected with a fourth motor 50A. Upon receipt of a driving force of the fourth motor 50A, the table 50 moves in the front-rear direction Y.

Figure 3:
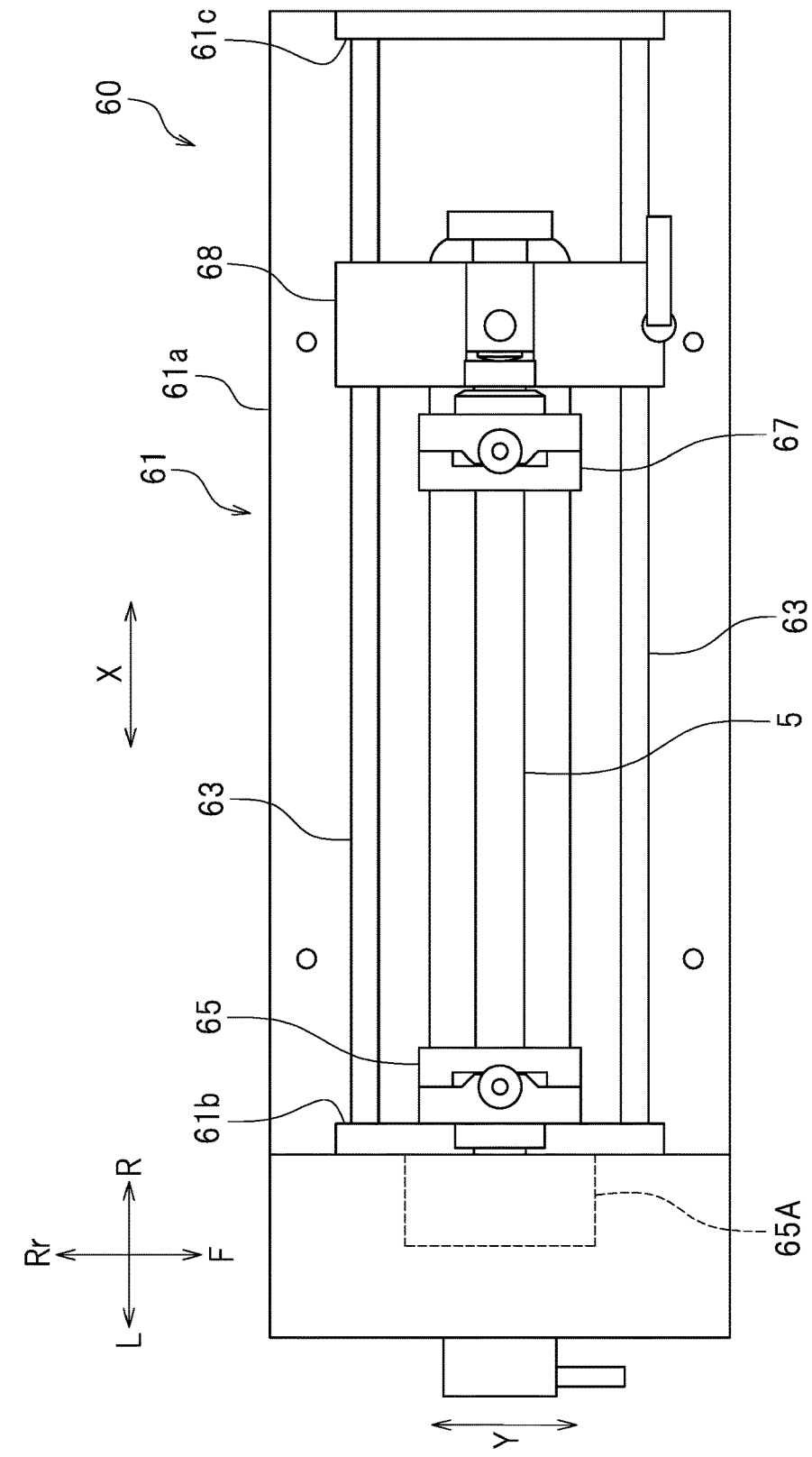
FIG. 3 is a plan view of a rotation mechanism.
Figure 4:
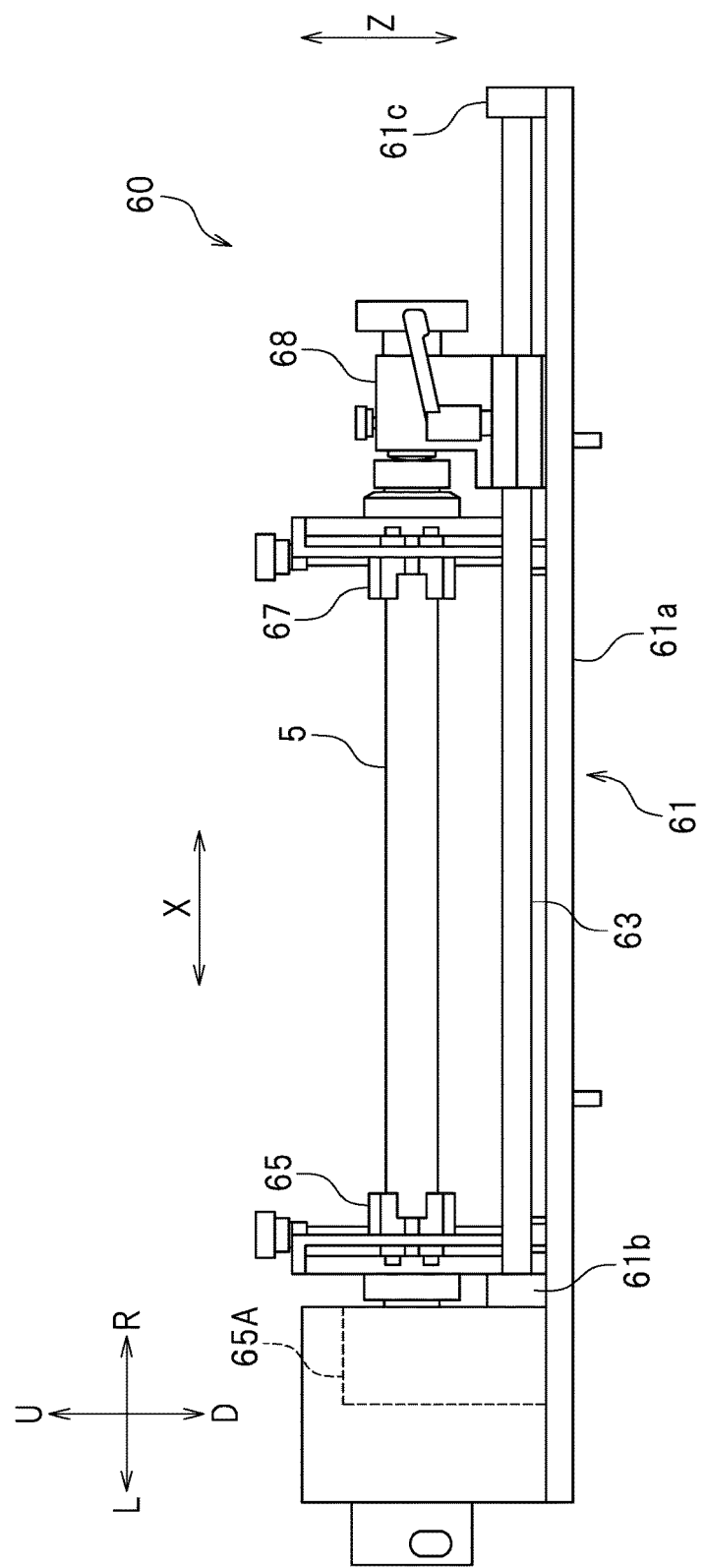
FIG. 4 is a front view of the rotation mechanism.

Now, the rotation mechanism 60 will be described. The rotation mechanism 60 is a mechanism that rotates, while supporting, the processing target 5 to perform cutting. The rotation mechanism 60 is detachably provided on the table 50. FIG. 3 is a plan view of the rotation mechanism 60. FIG. 4 is a front view of the rotation mechanism 60. In this preferred embodiment, as shown in FIG. 3, the rotation mechanism 60 includes a rotation mechanism main body 61, a pair of third guide rails 63, a first clamp 65, and a second clamp 67.

As shown in FIG. 4, the rotation mechanism main body 61 includes a bottom plate 61a, a left support member 61b, and a right support member 61c. The bottom plate 61a is a rectangular or substantially rectangular plate. Although not shown, the bottom plate 61a is located on the table 50. The left support member 61b extends upward from the bottom plate 61a. The right support member 61c is secured to a right end of the bottom plate 61a. The right support member 61c extends upward from the bottom plate 61a.

As shown in FIG. 3, the pair of third guide rails 63 are components extending in the left-right direction X. The pair of third guide rails 63 are arrayed in the front-rear direction Y. Left ends of the pair of third guide rails 63 are connected with the left support member 61b. Right ends of the pair of third guide rails 63 are connected with the right support member 61c. In this preferred embodiment, a slider 68 is slidably provided on the pair of third guide rails 63.

The first clamp 65 and the second clamp 67 hold the processing target 5. The first clamp 65 and the second clamp 67 seize the processing target 5 to hold the processing target 5. In this preferred embodiment, the first clamp 65 is rotatably provided on the left support portion 61b. The second clamp 67 is rotatably attached to the slider 68, which is slidably provided on the pair of third guide rails 63. In this example, the second clamp 67 moves in the left-right direction X along the pair of third guide rails 63 to change the distance between the first clamp 65 and the second clamp 67. Therefore, the distance between the first clamp and the second clamp 67 is changed by the length of the processing target 5 in the left-right direction X, so that the processing target 5 is held by the first clamp 65 and the second clamp 67 regardless of the size of the processing target 5.

In this preferred embodiment, the first clamp 65 rotates about a rotation axis extending in the left-right direction X, namely, the X-axis direction. In this example, the first clamp 65 is connected with a fifth motor 65A rotating the first clamp 65. It should be noted that the fifth motor 65A may be connected with the second clamp 67 to rotate the second clamp 67. In this example, the fifth motor 65A is driven to rotate the first clamp 65. Along with the rotation of the first clamp 65, the processing target 5 held by the first clamp 65 and the second clamp 67 is rotated about a rotation axis extending in the X-axis direction. The second clamp 67 rotates together with the processing target 5 along with the rotation of the first clamp 65.

Figure 5:
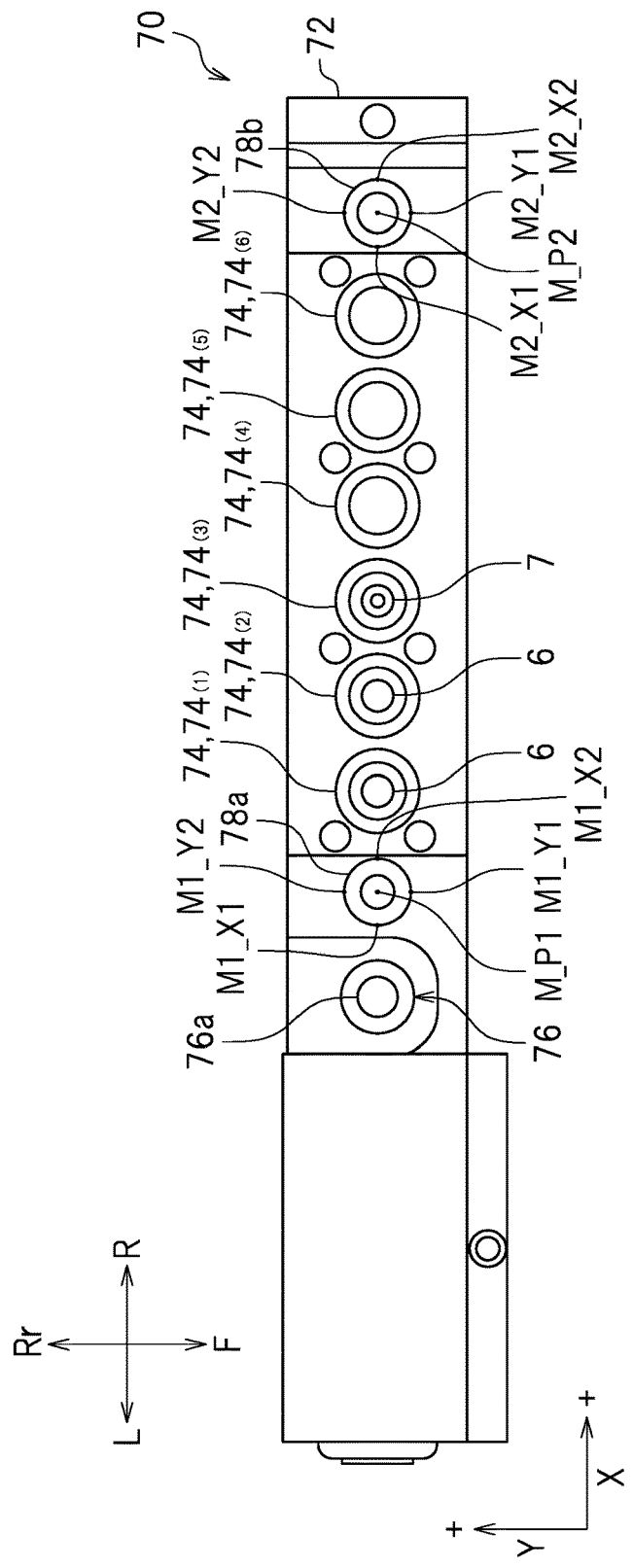
FIG. 5 is a plan view of a magazine.
Figure 6:
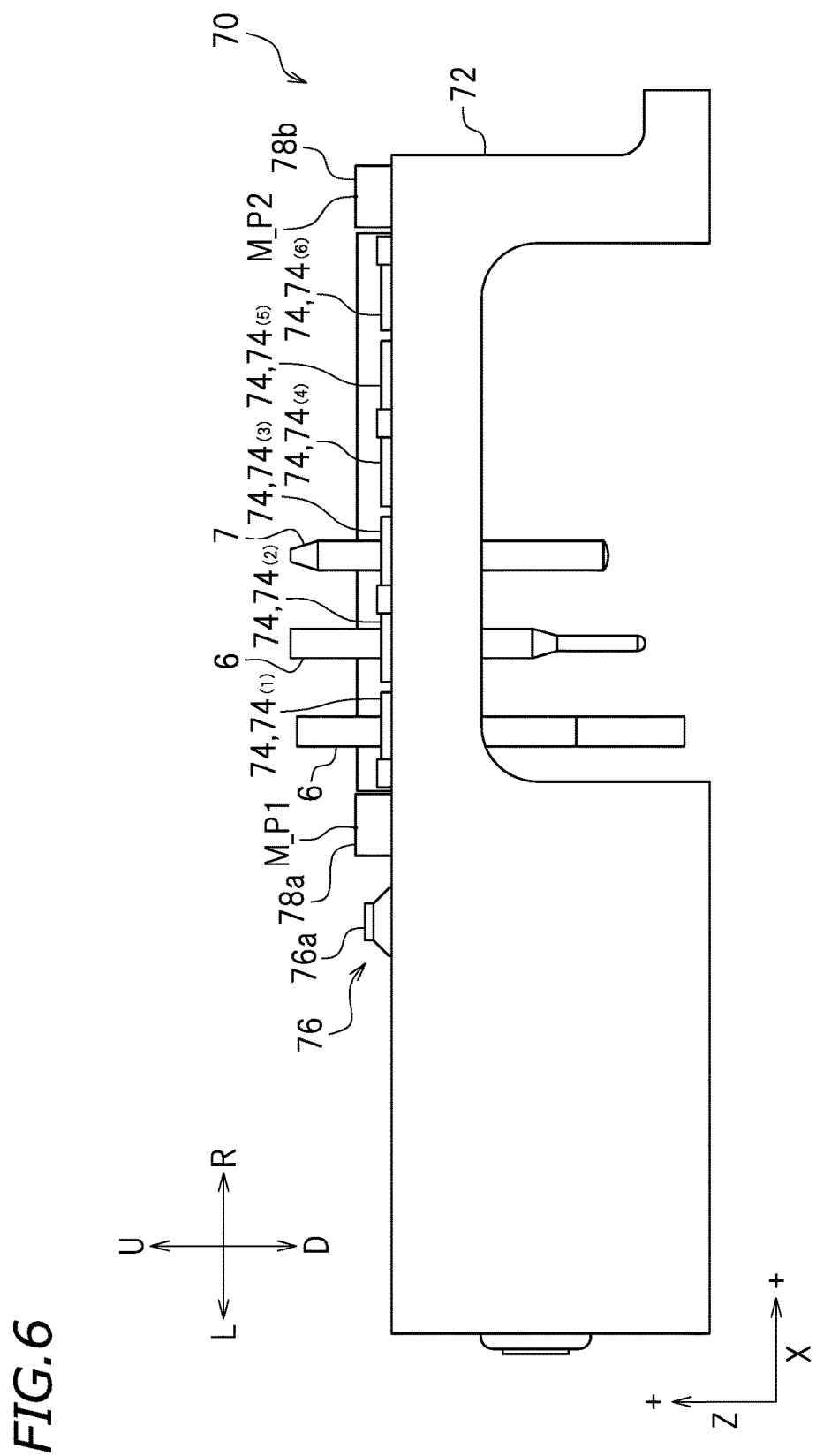
FIG. 6 is a front view of the magazine.

Now, the magazine 70 will be described. FIG. 5 is a plan view of the magazine 70. FIG. 6 is a front view of the magazine 70. As shown in FIG. 6, the magazine 70 is capable of accommodating the detection tool 7 and a plurality of the processing tools 6. As shown in FIG. 2, the magazine 70 is located inside the main body 10, and is located on the table 50. As shown in FIG. 5, the magazine 70 includes a magazine main body 72, a plurality of stockers 74, a tool sensor 76, a first protrusion 78a, and a second protrusion 78b. The magazine main body 72 is box-shaped.

The plurality of stockers 74 each accommodate either one of the processing tools 6 or the detection tool 7. In this preferred embodiment, the magazine main body 72 is provided with holes in a top surface thereof, and the holes form entrances of the stockers 74. The plurality of stockers 74 are arrayed in the left-right direction X. There is no specific limitation on the positions of the plurality of stockers 74. In this preferred embodiment, the plurality of stockers 74 are six stockers 74. Therefore, the magazine 70 in this preferred embodiment is capable of accommodating the processing tools 6 and the detection tool 7 in a total number of six, for example. There is no specific limitation on the number of the stockers 74. For example, seven or more stockers 74 may be provided.

The tool sensor 76 detects whether or not either one of the processing tools 6 or the detection tool 7 is grasped by the grasper 42 of the cutting head 40. The tool sensor 76 detects that either one of the processing tools 6 or the detection tool 7 has contacted the tool sensor 76 to confirm that either one of the processing tools 6 or the detection tool 7 is grasped by the grasper 42. There is no specific limitation on the technique by which the tool sensor 76 detects that either one of the processing tools 6 or the detection tool 7 has contacted the tool sensor 76. For example, in this preferred embodiment, the tool sensor 76 is cylindrical. The tool sensor 76 includes a protrusion provided on a top surface thereof. The protrusion protrudes to a level higher than that of the top surface of the magazine main body 72. The protrusion of the tool sensor 76 includes a contact sensor (not shown) including a switch 76a mechanically switchable between an ON state and an OFF state. A top surface of the switch 76a is, for example, slightly displaced by a slight load applied thereto, so that the contact sensor mechanically switches the switch 76a between the ON state and the OFF state. The switch 76a is switched to the ON state or to the OFF state, so that the tool sensor 76 detects that either one of the processing tools 6 or the detection tool 7 has contacted the tool sensor 76. In this preferred embodiment, the tool sensor 76 is provided on the magazine main body 72, at a position to the left of the stockers 74. There is no specific limitation on the position of the tools sensor 76. For example, the tool sensor 76 may be provided on the magazine main body 72, at a position to the right of the stockers 74.

The first protrusion 78a and the second protrusion 78b are protrusions usable to detect the actual position of the magazine 70. A specific method to use the first protrusion 78a and the second protrusion 78b to detect the actual position of the magazine 70 will be described below. In this preferred embodiment, as shown in FIG. 6, the first protrusion 78a and the second protrusion 78b are provided on the top surface of the magazine main body 72 and protrude to a level higher than that of the top surface of the magazine main body 72. There is no specific limitation on the position of the first protrusion 78a or the second protrusion 78b. In this preferred embodiment, as shown in FIG. 5, the first protrusion 78a is located to the left of the second protrusion 78b. Specifically, the first protrusion 78a is located to the left of the plurality of stockers 74 as seen in a plan view. The first protrusion 78a is located to the right of the tool sensor 76 as seen in a plan view. Namely, the first protrusion 78a is located between the tool sensor 76 and the leftmost stocker 74 among the plurality of stockers 74 as seen in a plan view. The second protrusion 78b is located to the right of the plurality of stockers 74 as seen in a plan view. The plurality of stockers 74 are located between the first protrusion 78a and the second protrusion 78b. In this preferred embodiment, the plurality of stockers 74, the tool sensor 76, the first protrusion 78a and the second protrusion 78b are arrayed in the left-right direction X. As shown in FIG. 6, a top surface of the first protrusion 78a and a top surface of the second protrusion 78b are at an equal level or substantially equal level to each other. The first protrusion 78a and the second protrusion 78b are cylindrical. As seen in a plan view, the first protrusion 78a and the second protrusion 78b are circular or substantially circular, for example.

FIG. 7 is a block diagram of the cutting device 100. As shown in FIG. 2 and FIG. 7, in this preferred embodiment, the first motor 32A connected with the carriage 32 is driven to move the carriage 32 and the cutting head 40 provided on the carriage 32 in the left-right direction X. As a result, either one of the processing tools 6 or the detection tool 7 that is grasped by the grasper 42 of the cutting head 40 is moved in the left-right direction X with respect to the magazine 70. The second motor 36A connected with the slidable member 36 is driven to move the slidable member 36 and the cutting head 40 provided on the slidable member 36 in the up-down direction Z. As a result, either one of the processing tools 6 or the detection tool 7 that is grasped by the grasper 42 is moved in the up-down direction Z with respect to the magazine 70. The fourth motor 50A connected with the table 50 is driven to move the table 50 and the rotation mechanism 60 attached to the table 50 in the front-rear direction Y. As a result, either one of the processing tools 6 or the detection tool 7 that is grasped by the grasper 42 is moved in the front-rear direction Y with respect to the magazine 70. In this preferred embodiment, the first motor 32A, the second motor 36A and the fourth motor 50A will be collectively referred to as a "movement mechanism 90". In other words, the movement mechanism 90 preferably includes the first motor 32A, the second motor 36A and the fourth motor 50A, for example. The movement mechanism 90 is a mechanism that moves the grasper 42 of the cutting head 40 three-dimensionally with respect to the magazine 70.

Now, the controller 80 in this preferred embodiment will be described. The controller 80 is a device that performs control on cutting and detects the actual position of the magazine 70. The controller 80 is provided inside the main body 10 of the cutting device 100. There is no specific limitation on the position of the controller 80. There is no specific limitation on the structure of the controller 80. For example, the controller includes a microcomputer, and includes a central processing unit (hereinafter, referred to as a "CPU"), a ROM storing a program and the like executable by the CPU, a RAM and the like. In this example, the program stored on the microcomputer is used to perform control on cutting, and control of adjusting the position of each of the components.

In this preferred embodiment, as shown in FIG. 7, the controller 80 is connected with the operation panel 25. The operation panel 25 is operated by the user, so that a signal is transmitted from the operation panel 25 to the controller 80. Based on the signal received from the operation panel 25, the controller 80 performs control on cutting. The controller 80 is connected with the first motor 32A, which is connected with the carriage 32. The controller 80 controls the driving of the first motor 32A to control the movement of the carriage 32 and the cutting head 40 in the left-right direction X. The controller 80 is connected with the second motor 36A, which is connected with the slidable member 36, on which the cutting head 40 is provided. The controller 80 controls the driving of the second motor 36A to control the movement of the cutting head 40 in the up-down direction Z. The control 80 is connected with the third motor 44A, which is connected with the spindle 44. The controller 80 controls the driving of the third motor 44A to control the rotation of the spindle 44 and the rotation of either one of the processing tools 6 or the detection tool 7 that is grasped by the grasper 42.

The controller 80 is connected with the fourth motor 50A, which is connected with the table 50. The controller 80 controls the driving of the fourth motor 50A to control the movement of the table 50 and the rotation mechanism 60 attached to the table 50 in the front-rear direction Y. The controller 80 is connected with the fifth motor 65A, which is connected with the first clamp 65 of the rotation mechanism 60. The controller 80 controls the driving of the fifth motor 65A to control the rotation of the first clamp 65 and the processing target 5 held by the first clamp 65 and the second clamp 67. The controller 80 is connected with the tool sensor 76. In this example, the controller 80 detects that the switch 76a (see FIG. 5) of the tool sensor 76 is switched ON or OFF to detect whether or not either one of the processing tools 6 or the detection tool 7 that is grasped by the grasper 42 has contacted the tool sensor 76 (more precisely, the switch 76a). The controller 80 has, stored thereon, the position of either one of the processing tools 6 or the detection tool 7 that is grasped by the grasper 42. For example, the controller 80 is capable of detecting the position of the detection tool 7 grasped by the grasper 42 when the detection tool 7 contacts another component.

Figure 8:
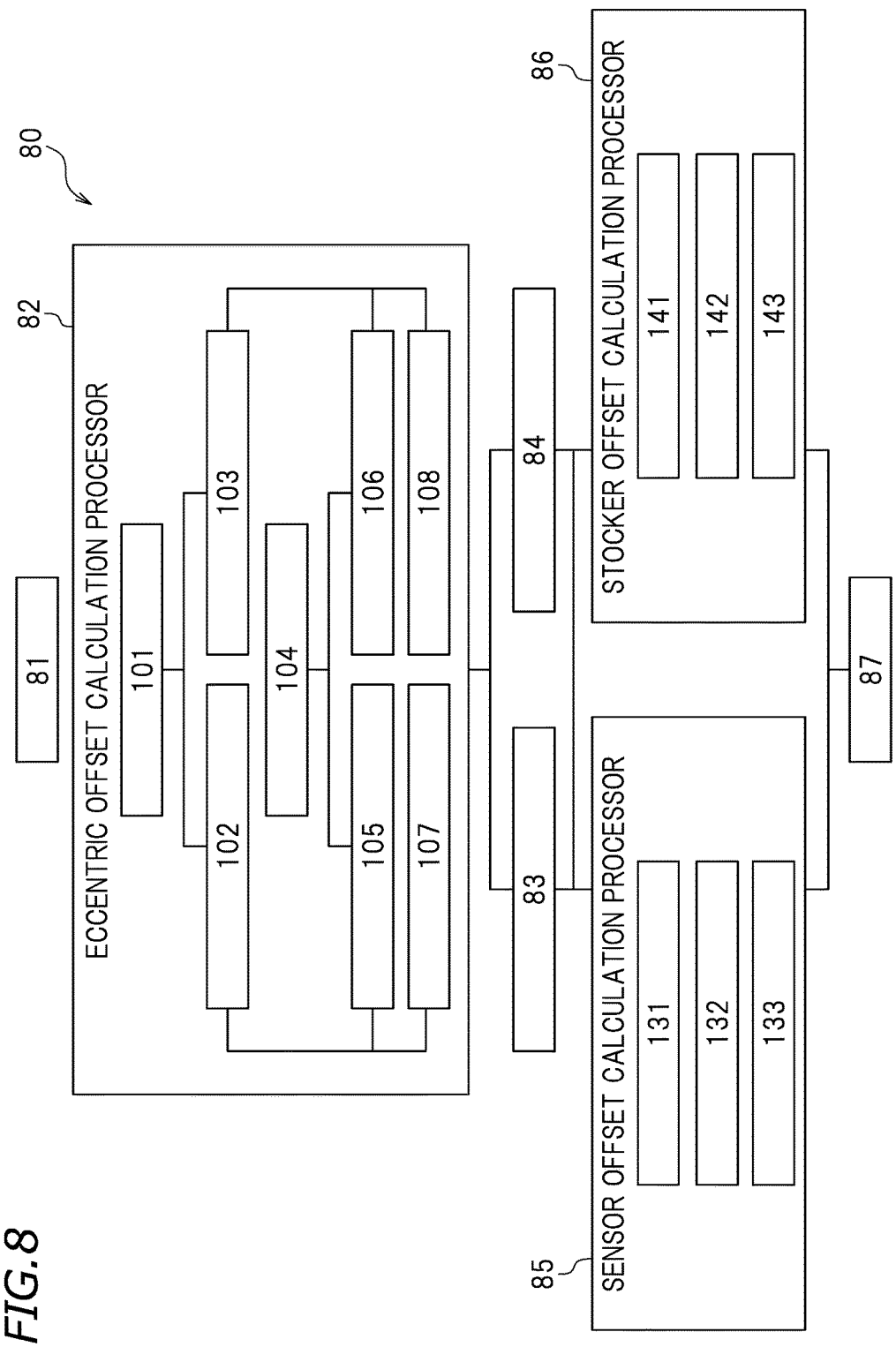
FIG. 8 is a block diagram of a controller.
Figure 9:
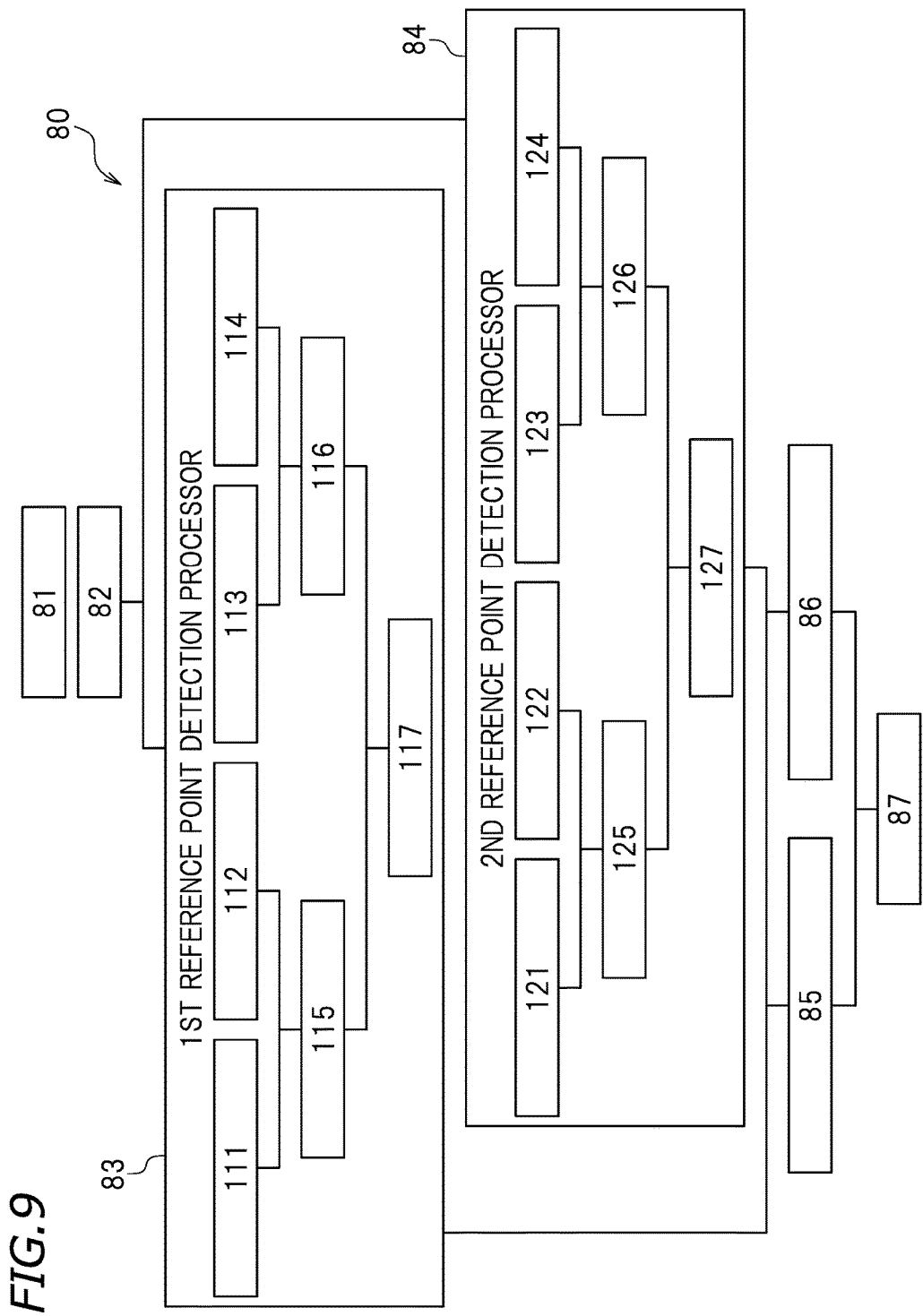
FIG. 9 is a block diagram of the controller.

FIG. 8 and FIG. 9 are each a block diagram of the controller 80. In this preferred embodiment, the controller 80 includes a storage 81, an eccentric offset calculation processor 82, a first reference point detection processor 83, a second reference point detection processor 84, a sensor offset calculation processor 85, a stocker offset calculation processor 86, and a movement control processor 87. The above-listed components are each realized by one or at least two processors, and each include one or at least two processors. The above-listed components may be realized by software or hardware. For example, the above-listed components may each include a circuit.

The structure of the cutting device 100 in this preferred embodiment is described above. The storage 81 of the controller 80 has a designed position of the magazine 70 stored thereon in advance. Namely, the storage 81 has, stored thereon in advance, the designed positions of the plurality of stockers 74 of the magazine 70 and the designed position of the tool sensor 76. These positions are specified by, for example, XYZ coordinates in an XYZ orthogonal coordinate system. There is no specific limitation on the origin of the XYZ orthogonal coordinate system. Based on the designed position of the magazine 70, the cutting device 100 causes either one the processing tools 6 accommodated in the stockers 74 to be grasped by the grasper 42 or causes the processing tool 6 grasped by the grasper 42 to be accommodated in the stocker 74. Based on the designed position of the magazine 70, the tool sensor 76 detects the processing tool 6 that is grasped by the grasper 42. In this preferred embodiment, the "designed position" refers to the theoretical position in the cutting device 100, for example, a position specified during the designing stage on a personal computer.

However, during the attachment of the magazine 70 to the main body 10 of the cutting device 100, an assembling error of the magazine 70 to the main body 10 may occur. In the case where there is such an assembling error, the actual position of the magazine 70 may be different from the designed position of the magazine 70. In the case where the actual position of the magazine 70 is different from the designed position of the magazine 70, the processing tool 6 accommodated in the stocker 74 of the magazine 70 may not be properly grasped by the grasper 42. The processing tool 6 grasped by the grasper 42 may not be properly accommodated in the stocker 74. In the case where the actual position of the magazine 70 is different from the designed position of the magazine 70, the processing tool 6 grasped by the grasper 42 may not be properly detected by the tool sensor 76.

In such a situation, in this preferred embodiment, when the magazine 70 is attached to the main body 10, a sensor offset, which is a correction value on the actual position of the tool sensor 76 of the magazine 70 with respect to the designed position of the tool sensor 76, and a stocker offset, which is a correction value on the actual position of each stocker 74 with respect to the designed position of each stocker 74, are calculated. The movement mechanism 90 is controlled in consideration of the sensor offset and the stocker offset. In the following description, the sensor offset and the stocker offset may be collectively referred to as a "magazine offset".

Figure 10:
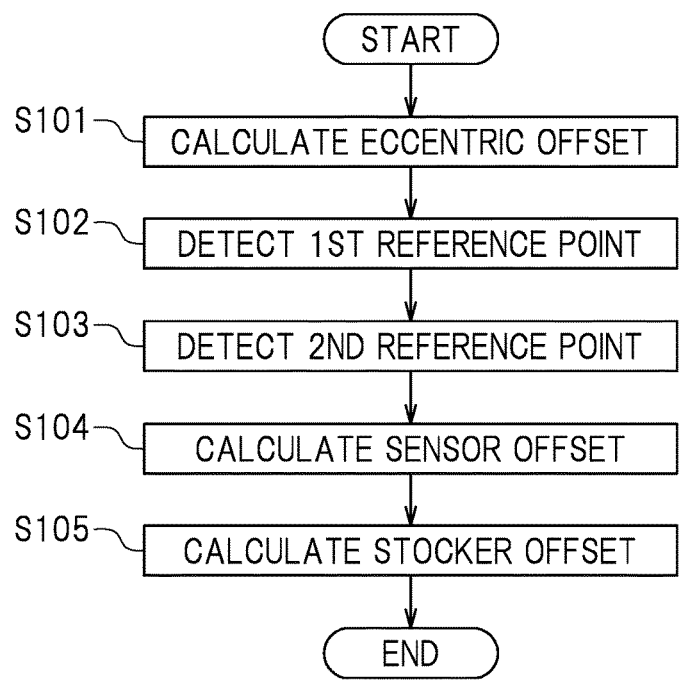
FIG. 10 is a flowchart showing a procedure to calculate a sensor offset and a stocker offset.

FIG. 10 is a flowchart showing a procedure to calculate the magazine offset. Hereinafter, with reference to the flowchart in FIG. 10, a procedure to calculate the sensor offset and the stocker offset of each of the plurality of stockers 74 will be described.

In this preferred embodiment, a rotation reference position, which is a reference position to rotate the grasper 42, is preset for the spindle 44. The storage 81 of the controller 80 has the rotation reference position stored thereon in advance. In the following description, the rotation angle of the spindle 44 when the spindle 44 is located at the rotation reference position is 0°. In this preferred embodiment, to calculate the magazine offset, the detection tool 7 is grasped by the grasper 42 of the cutting head 40. The detection tool 7 is used to calculate the magazine offset, namely, the sensor offset and the stocker offset.

First, in step S101 in FIG. 10, the eccentric offset calculation processor 82 calculates an eccentric offset. In the case where, for example, as shown in FIG. 2, the grasper 42 of the cutting head 40 grasps the detection tool 7 (or the processing tool 6), it is preferable that the detection tool 7 is grasped such that the axial direction of the detection tool 7 is the same as the axial direction of the spindle 44. However, the grasper 42 may grasp the detection tool 7 in the state where the axial direction of the detection tool 7 is slightly offset from the axial direction of the spindle 44. In this case, the position (more precisely, the coordinate position) at which the detection tool 7 contacts another component may vary in accordance with the rotation angle of the spindle 44. In this preferred embodiment, the value to correct the error of the position of the detection tool 7 when the spindle 44 is rotated will be referred to as an "eccentric offset". In this preferred embodiment, the "eccentric offset" is a position difference between the detection tool 7 grasped by the grasper 42 when the rotation angle of the spindle 44 is 0° and the detection tool 7 grasped by the grasper 42 when the rotation angle of the spindle 44 is 180°, for example. In this example, the "eccentric offset" includes an eccentric X offset, which is an eccentric offset in the X-axis direction, and an eccentric Y offset, which is an eccentric offset in the Y-axis direction.

Figure 11:
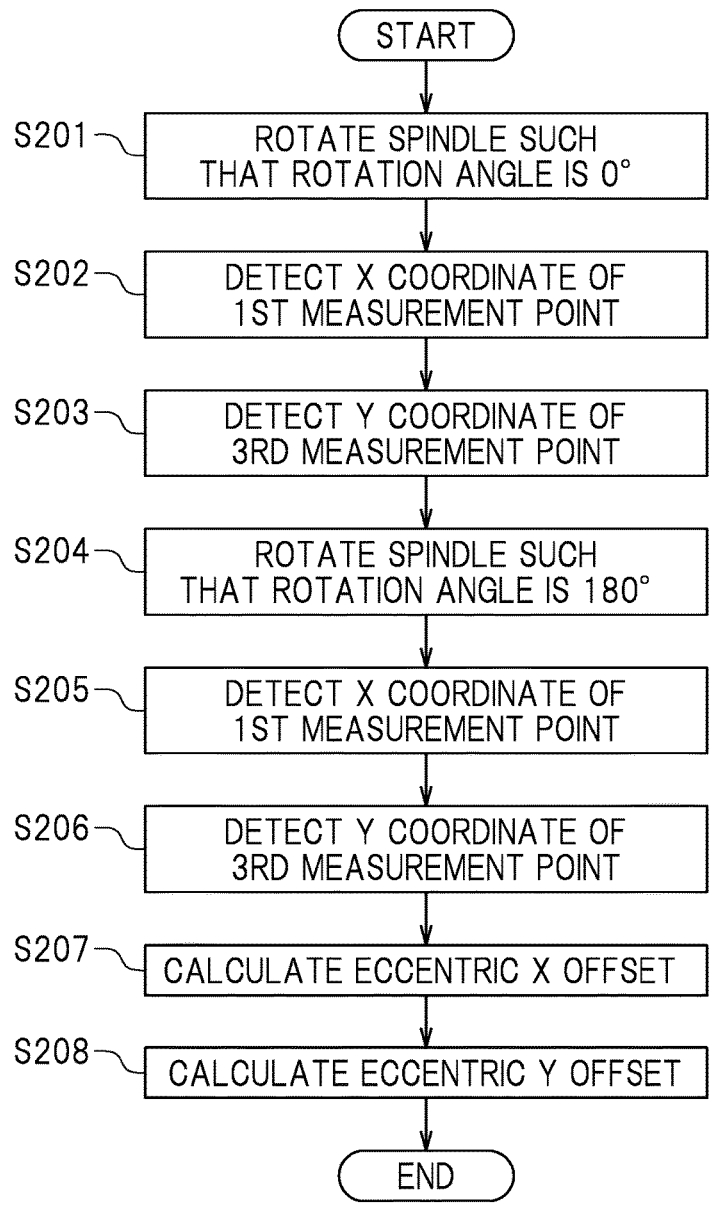
FIG. 11 is a flowchart showing a procedure to calculate an eccentric offset.

FIG. 11 is a flowchart showing a procedure to calculate the eccentric offset. In this preferred embodiment, the eccentric offset is calculated by the eccentric offset calculation processor 82 by the procedure shown in the flowchart of FIG. 11. In this example, as shown in FIG. 8, the eccentric offset calculation processor 82 includes a first spindle rotation processor 101, a first angle X detection processor 102, a first angle Y detection processor 103, a second spindle rotation processor 104, a second angle X detection processor 105, a second angle Y detection processor 106, an eccentric X offset calculation processor 107, and an eccentric Y offset calculation processor 108.

First, in step S201 in FIG. 11, the first spindle rotation processor 101 rotates the spindle 44 such that the rotation angle of the spindle 44 is 0° with respect to the rotation reference position.

Next, in step S202, referring to FIG. 5, the first angle X detection processor 102 detects an X coordinate of a first measurement point M1_X1 when the rotation angle of the spindle 44 is 0°. The "first measurement point M1_X1" is a point that is on an outer circumferential surface of the first protrusion 78a and is at an end of the outer circumferential surface in the left-right direction X, namely, in the X-axis direction (in this example, the end is the left end). In this preferred embodiment, the first angle X detection processor 102 controls the movement mechanism 90 such that the detection tool 7 grasped by the grasper 42 contacts the first protrusion 78a, and thus detects the X coordinate of the first measurement point M1_X1. The X coordinate of the first measurement point M1_X1 detected in step S202 will be referred to as a "first eccentric X coordinate". In this preferred embodiment, the first measurement point M1_X1 corresponds to a "ninth measurement point".

Next, in step S203 in FIG. 11, referring to FIG. 5, the first angle Y detection processor 103 detects a Y coordinate of a third measurement point M1_Y1 when the rotation angle of the spindle 44 is 0°. The "third measurement point M1_Y1" is a point that is on the outer circumferential surface of the first protrusion 78a and is at an end of the outer circumferential surface in the front-rear direction Y, namely, in the Y-axis direction (in this example, the end is the front end). In this preferred embodiment, the first angle Y detection processor 103 controls the movement mechanism 90 such that the detection tool 7 grasped by the grasper 42 contacts the first protrusion 78a, and thus detects the Y coordinate of the third measurement point M1_Y1. The Y coordinate of the third measurement point M1_Y1 detected in step S203 will be referred to as a "first eccentric Y coordinate". In this preferred embodiment, the third measurement point M1_Y1 corresponds to a "tenth measurement point".

Next, in step S204 in FIG. 11, the second spindle rotation processor 104 rotates the spindle by 180° with respect to the rotation reference position. A surface of the spindle 44 that faced the left side of the detection tool 7 before this step faces the right side of the detection tool 7 after this step. A surface of the spindle 44 that faced the front side of the detection tool 7 before this step faces the rear side of the detection tool 7 after this step.

Next, in step S205, the second angle X detection processor 105 detects the X coordinate of the first measurement point M1_X1 when the rotation angle of the spindle 44 is 180°. The procedure for the detection is substantially the same as that in step S202. The X coordinate of the first measurement point M1_X1 detected in step S205 will be referred to as a "second eccentric X coordinate".

Next, in step S206, the second angle Y detection processor 106 detects the Y coordinate of the third measurement point M1_Y1 when the rotation angle of the spindle 44 is 180°. The procedure for the detection is substantially the same as that in step S203. The Y coordinate of the third measurement point M1_Y1 detected in step S206 will be referred to as a "second eccentric Y coordinate".

Next, in step S207, the eccentric X offset calculation processor 107 calculates the eccentric X offset, which is an eccentric offset in the X-axis direction, from the first eccentric X coordinate detected by the first angle X detection processor 102 and the second eccentric X coordinate detected by the second angle X detection processor 105. In this preferred embodiment, the eccentric X offset calculation processor 107 sets a difference between the first eccentric X coordinate and the second eccentric X coordinate as the eccentric X offset.

Next, in step S208, the eccentric Y offset calculation processor 108 calculates the eccentric Y offset, which is an eccentric offset in the Y-axis direction, from the first eccentric Y coordinate detected by the first angle Y detection processor 103 and the second eccentric Y coordinate detected by the second angle Y detection processor 106. In this preferred embodiment, the eccentric Y offset calculation processor 108 sets a difference between the first eccentric Y coordinate and the second eccentric Y coordinate as the eccentric Y offset. In this manner, the eccentric offset calculation processor 82 calculates the eccentric X offset and the eccentric Y offset to calculate the eccentric offset.

As described above, the eccentric offset is detected in step S101 in FIG. 10. After this, in step S102, referring to FIG. 5, the first reference point detection processor 83 detects a first reference point M_P1, which is a center point of the top surface of the first protrusion 78a. The first reference point detection processor 83 controls the movement mechanism 90 such that the detection tool 7 grasped by the grasper 42 contacts the first protrusion 78a, and thus detects the actual position of the first reference point M_P1. There is no specific limitation on the procedure for detecting the first reference point M_P1. In this preferred embodiment, the first reference point detection processor 83 executes the procedure shown in the flowchart of FIG. 12 to calculate the first reference point M_P1. In this example, as shown in FIG. 9, the first reference point detection processor 83 includes a first measurement point detection processor 111, a second measurement point detection processor 112, a third measurement point detection processor 113, a fourth measurement point detection processor 114, a first reference point X calculation processor 115, a first reference point Y calculation processor 116, and a first reference point Z detection processor 117.

Figure 12:
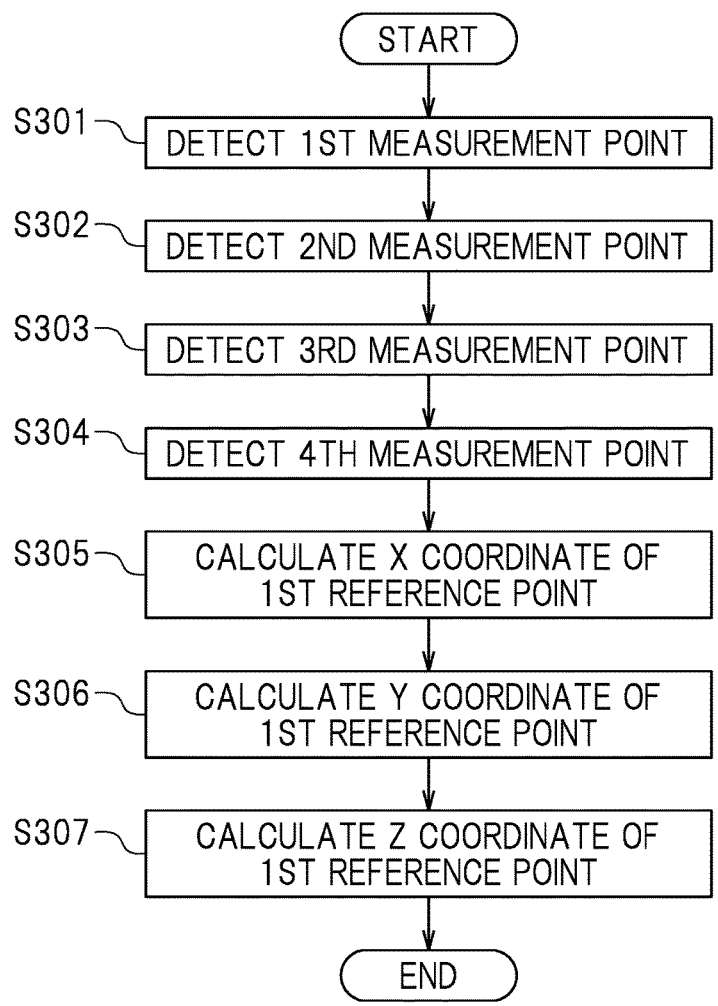
FIG. 12 is a flowchart showing a procedure for detecting a first reference point.

In step S301 in FIG. 12, the first measurement point detection processor 111 detects the first measurement point M1_X1 shown in FIG. 5. The first measurement point detection processor 111 controls the movement mechanism 90 such that the detection tool 7 grasped by the grasper 42 contacts the first protrusion 78a from the left, and thus detects the XY coordinates of the first measurement point M1_X1. Next, in step S302 in FIG. 12, the second measurement point detection processor 112 detects a second measurement point M1_X2 shown in FIG. 5. As shown in FIG. 5, the second measurement point M1_X2 is a point that is on the outer circumferential surface of the first protrusion 78a and has an X coordinate different from that of the first measurement point M1_X1. The second measurement point M1_X2 has a Y coordinate same as that of the first measurement point M1_X1. In this preferred embodiment, the first measurement point M1_X1 and the second measurement point M1_X2 are arrayed in the left-right direction X. As seen in a plan view, the first measurement point M1_X1 is the leftmost point among points on the outer circumferential surface of the first protrusion 78a. The second measurement point M1_X2 is at the rightmost point among the points on the outer circumferential surface of the first protrusion 78a. In this example, the second measurement point detection processor 112 controls the movement mechanism 90 such that the detection tool 7 grasped by the grasper of the cutting head 40 contacts the outer circumferential surface of the first protrusion 78a from the right. The second measurement point detection processor 112 sets the point at which the detection tool 7 and the outer circumferential surface of the first protrusion 78a contact each other as the second measurement point M1_X2, and detects the XY coordinates of the second measurement point M1_X2.

Next, in step S303 in FIG. 12, the third measurement point detection processor 113 detects the third measurement point M1_Y1 shown in FIG. 5. The third measurement point M1_Y1 is the foremost point among the points on the outer circumferential surface of the first protrusion 78a. The third measurement point M1_Y1 has, as an X coordinate, an X coordinate of a median point between the X coordinate of the first measurement point M1_X1 and the X coordinate of the second measurement point M1_X2. The third measurement point detection processor 113 controls the movement mechanism 90 such that the detection tool 7 grasped by the grasper contacts the first protrusion 78a from the front, and thus detects the XY coordinates of the third measurement point M1_Y1.

Next, in step S304 in FIG. 12, the fourth measurement point detection processor 114 detects a fourth measurement point M1_Y2 shown in FIG. 5. As shown in FIG. 5, the fourth measurement point M1_Y2 is a point on the outer circumferential surface of the first protrusion 78a and has an X coordinate same as that of the third measurement point M1_Y1. The fourth measurement point M1_Y2 has a Y coordinate different from that of the third measurement point M1_Y1. The fourth measurement point M1_Y2 is the rearmost point among the points on the outer circumferential surface of the first protrusion 78a. The fourth measurement point M1_Y2 faces the third measurement point M1_Y1. The fourth measurement point detection processor 114 controls the movement mechanism 90 such that the detection tool 7 grasped by the grasper 42 contacts the first protrusion 78a from the rear of the first protrusion 78a, and thus detects the XY coordinates of the fourth measurement point M1_Y2.

As described above, the first measurement point M1_X1, the second measurement point M1_X2, the third measurement point M1_Y1 and the fourth measurement point M1_Y2 are detected. After this, in step S305 in FIG. 12, the first reference point X calculation processor 115 calculates an X coordinate of the first reference point M_P1. In this preferred embodiment, the first reference point X calculation processor 115 sets an X coordinate of a median point between the X coordinate of the first measurement point M1_X1 and the X coordinate of the second measurement point M1_X2 as the X coordinate of the first reference point M_P1. In this example, where the X coordinate of the first reference point M_P1 is M_P1$x$, the X coordinate of the first measurement point M1_X1 is M1_X1$x$, and the X coordinate of the second measurement point M1_X2 is M1_X2$x$, the X coordinate of the first reference point M_P1 is represented by the following expression (1).

$$M\_P1x = (M1\_X1x + M1\_X2x)/2 \qquad (1)$$

Next, in step S306, the first reference point Y calculation processor 116 calculates a Y coordinate of the first reference point M_P1. In this preferred embodiment, the first reference point Y calculation processor 116 sets a Y coordinate of a median point between the Y coordinate of the third measurement point M1_Y1 and the Y coordinate of the fourth measurement point M1_Y2 as the Y coordinate of the first reference point M_P1. In this example, where the Y coordinate of the first reference point M_P1 is M_P1$y$, the Y coordinate of the third measurement point M1_Y1 is M1_Y1$y$, and the Y coordinate of the fourth measurement point M1_Y2 is M1_Y2$y$, the Y coordinate of the first reference point M_P1 is represented by the following expression (2).

$$M\_P1y = (M1\_Y1y + M1\_Y2y)/2 \qquad (2)$$

Next, in step S307, the first reference point Z detection processor 117 detects a Z coordinate of the first reference point M_P1. The first reference point Z detection processor 117 controls the movement mechanism 90 such that a tip of the detection tool 7 grasped by the grasper 42 of the cutting head 40 is at a higher level than that of the first protrusion 78a has, as an X coordinate, the X coordinate of the first reference point M_P1 and has, as a Y coordinate, the Y coordinate of the first reference point M_P1. The first reference point Z detection processor 117 moves the grasper 42 downward, and causes the detection tool 7 grasped by the grasper 42 to contact the first protrusion 78a from above the first protrusion 78a. A Z coordinate of the tip of the detection tool 7 grasped by the grasper 42 when the detection tool 7 contacts the first protrusion 78a is the Z coordinate of the first reference point M_P1. To calculate the XYZ coordinates of the first reference point M_P1 as described above, the eccentric offset (eccentric X offset and eccentric Y offset) calculated by the eccentric offset calculation processor 82 may be used to make a correction. In the above-described manner, the X coordinate, the Y coordinate and the Z coordinate of the first reference point M_P1 are detected. The X coordinate, the Y coordinate and the Z coordinate of the first reference point M_P1 are stored on the storage 81.

As described above, the first reference point M_P1 is detected in step S102 in FIG. 10. After this, in step S103, referring to FIG. 5, the second reference point detection processor 84 detects a second reference point M_P2, which is a center point of the top surface of the second protrusion 78b. The second reference point detection processor 84 controls the movement mechanism 90 such that the detection tool 7 grasped by the grasper 42 contacts the second protrusion 78b, and thus detects an actual position of the second reference point M_P2. In this preferred embodiment, the second reference point detection processor 84 executes the procedure shown in the flowchart of FIG. 13 to calculate the second reference point M_P2. In this example, as shown in FIG. 9, the second reference point detection processor 84 includes a fifth measurement point detection processor 121, a sixth measurement point detection processor 122, a seventh measurement point detection processor 123, an eighth measurement point detection processor 124, a second reference point X calculation processor 125, a second reference point Y calculation processor 126, and a second reference point Z detection processor 127.

Figure 13:
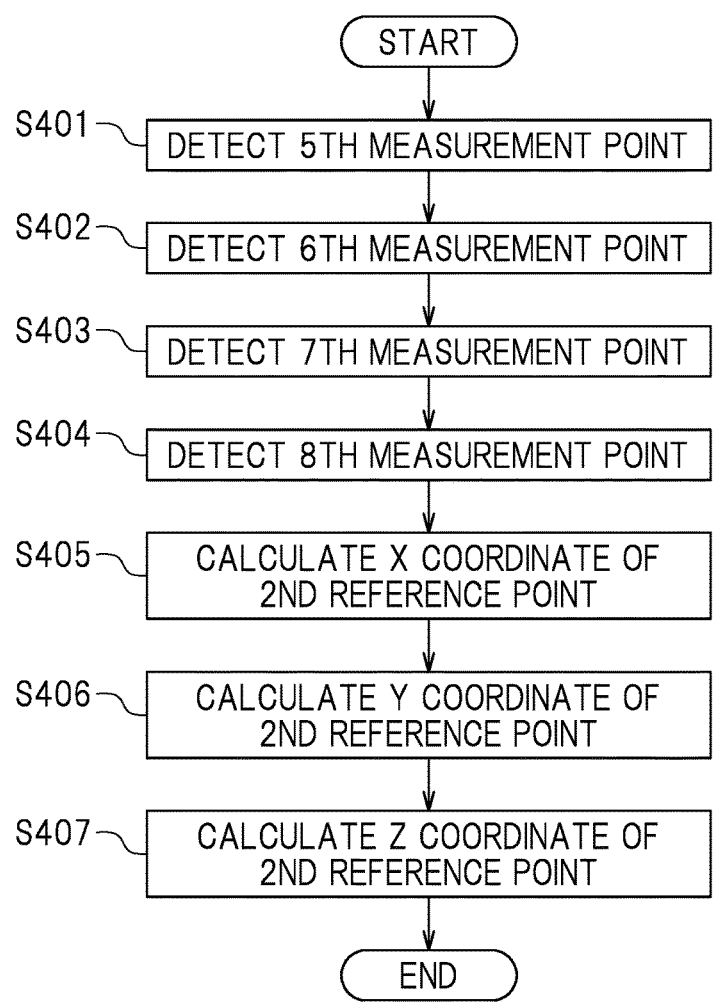
FIG. 13 is a flowchart showing a procedure for detecting a second reference point.

In step S401 in FIG. 13, the fifth measurement point detection processor 121 detects a fifth measurement point M2_X1. In step S402, the sixth measurement point detection processor 122 detects a sixth measurement point M2_X2. As shown in FIG. 5, the fifth measurement point M2_X1 and the sixth measurement point M2_X2 are each a point on an outer circumferential surface of the second protrusion 78b. In this example, the fifth measurement point M2_X1 and the sixth measurement point M2_X2 are arrayed in the left-right direction X. The sixth measurement point M2_X2 has an X coordinate different from that of the fifth measurement point M2_X1, and has a Y coordinate same as that of the fifth measurement point M2_X1. As seen in a plan view, the fifth measurement point M2_X1 is the leftmost point among points on the outer circumferential surface of the second protrusion 78b. The sixth measurement point M2_X2 is the rightmost point among the points on the outer circumferential surface of the second protrusion 78b.

The fifth measurement point detection processor 121 controls the movement mechanism 90 such that the detection tool 7 grasped by the grasper 42 contacts the second protrusion 78b, and thus detects the XY coordinates of the fifth measurement point M2_X1. The sixth measurement point detection processor 122 controls the movement mechanism 90 such that the detection tool 7 grasped by the grasper 42 contacts the second protrusion 78b, and thus detects XY coordinates of the sixth measurement point M2_X2.

Next, in step S403 in FIG. 13, the seventh measurement point detection processor 123 detects a seventh measurement point M2_Y1. In step S404, the eighth measurement point detection processor 124 detects an eighth measurement point M2_Y2. As shown FIG. 5, the seventh measurement point M2_Y1 has, as an X coordinate, an X coordinate of a median point between the X coordinate of the fifth measurement point M2_X1 and the X coordinate of the sixth measurement point M2_X2. The eighth measurement point M2_Y2 is a point on the outer circumferential surface of the second protrusion 78b and has an X coordinate same as that of the seventh measurement point M2_Y1. The eighth measurement point M2_Y2 has a Y coordinate different from that of the seventh measurement point M2_Y1. The seventh measurement point M2_Y1 is the foremost point among the points on the outer circumferential surface of the second protrusion 78b. The eighth measurement point M2_Y2 is the rearmost point among the points on the outer circumferential surface of the second protrusion 78b. In this example, the seventh measurement point M2_Y1 and the eighth measurement point M2_Y2 are arrayed in the front-rear direction Y.

The seventh measurement point detection processor 123 controls the movement mechanism 90 such that the detection tool 7 grasped by the grasper 42 contacts the second protrusion 78b, and thus detects the XY coordinates of the seventh measurement point M2_Y1. The eighth measurement point detection processor 124 controls the movement mechanism 90 such that the detection tool 7 grasped by the grasper 42 contacts the second protrusion 78b, and thus detects the XY coordinates of the eighth measurement point M2_Y2.

As described above, the fifth measurement point M2_X1, the sixth measurement point M2_X2, the seventh measurement point M2_Y1 and the eighth measurement point M2_Y2 are detected. After this, in step S405 in FIG. 13, the second reference point X calculation processor 125 calculates an X coordinate of the second reference point M_P2. The second reference point X calculation processor 125 sets an X coordinate of a median point between the X coordinate of the fifth measurement point M2_X1 and the X coordinate of the sixth measurement point M2_X2 as the X coordinate of the second reference point M_P1. In this example, where the X coordinate of the second reference point M_P2 is M_P2x, the X coordinate of the fifth measurement point M2_X1 is M2_X1x, and the X coordinate of the sixth measurement point M2_X2 is M2_X2x, the X coordinate of the second reference point M_P2 is represented by the following expression (3).

$$M\_P2x=(M2\_X1x+M2\_X2x)/2 \qquad (3)$$

Next, in step S406 in FIG. 13, the second reference point Y calculation processor 126 calculates a Y coordinate of the second reference point M_P2. The second reference point Y calculation processor 126 sets a Y coordinate of a median point between the Y coordinate of the seventh measurement point M2_Y1 and the Y coordinate of the eighth measurement point M2_Y2 as the Y coordinate of the second reference point M_P2. In this example, where the Y coordinate of the second reference point M_P2 is M_P2y, the Y coordinate of the seventh measurement point M2_Y1 is M2_Y1y, and the Y coordinate of the eighth measurement point M2_Y2 is M2_Y2y, the Y coordinate of the second reference point M_P2 is represented by the following expression (4).

$$M\_P2y=(M2\_Y1y+M2\_Y2y)/2 \qquad (4)$$

Next, in step S407 in FIG. 13, the second reference point Z detection processor 127 detects a Z coordinate of the second reference point M_P2. The second reference point Z detection processor 127 controls the movement mechanism 90 such that the tip of the detection tool 7 grasped by the grasper 42 is at a higher level than that of the first protrusion 78a, has, as an X coordinate, the X coordinate of the second reference point M_P2 and has, as a Y coordinate, the Y coordinate of the second reference point M_P2. The second reference point Z detection processor 127 moves the grasper 42 downward, and causes the detection tool 7 grasped by the grasper 42 to contact the second protrusion 78b from above the second protrusion 78b. A Z coordinate of the tip of the detection tool 7 grasped by the grasper 42 when the detection tool 7 contacts the second protrusion 78b is the Z coordinate of the second reference point M_P2. To calculate the XYZ coordinates of the second reference point M_P2 as described above, the eccentric offset (eccentric X offset and eccentric Y offset) calculated by the eccentric offset calculation processor 82 may be used to make a correction. Thus, the XYZ coordinates of the second reference point M_P2 are calculated. In the above-described manner, the X coordinate, the Y coordinate and the Z coordinate of the second reference point M_P2 are detected. The X coordinate, the Y coordinate and the Z coordinate of the second reference point M_P2 are stored on the storage 81.

As described above, the XYZ coordinates of each of the first reference point M_P1 and the second reference point M_P2 are calculated. After this, in step S104 in FIG. 10, the sensor offset calculation processor 85 calculates the sensor offset, which is an offset of the tool sensor 76. In this preferred embodiment, the sensor offset includes a sensor X offset, which is a sensor offset in the X-axis direction, a sensor Y offset, which is a sensor offset in the Y-axis direction, and a sensor Z offset, which is a sensor offset in the Z-axis direction. Hereinafter, a procedure to calculate each of the sensor X offset, the sensor Y offset and the sensor Z offset will be described in detail.

In this preferred embodiment, as shown in FIG. 8, the sensor offset calculation processor 85 includes a sensor X offset calculation processor 131, a sensor Y offset calculation processor 132, and a sensor Z offset calculation processor 133. The sensor X offset calculation processor 131 calculates the sensor X offset. The sensor Y offset calculation processor 132 calculates the sensor Y offset. The sensor Z offset calculation processor 133 calculates the sensor Z offset. In this preferred embodiment, the storage 81 has, stored thereon in advance, designed X coordinate, Y coordinate and Z coordinate of the first reference point M_P1, and a designed Z coordinate of a top surface of the tool sensor 76.

First, the sensor X offset calculation processor 131 calculates the sensor X offset by the following expression (5). In expression (5), E1x is the sensor X offset, M_P1x is the X coordinate of the first reference point M_P1, and DM_P1x is the designed X coordinate of the first reference point M_P1.

$$E1x = M\_P1x - DM\_P1x \quad (5)$$

The X coordinate M_P1x of the first reference point M_P1 may be calculated by the above-described expression (1).

The sensor Y offset calculation processor 132 calculates the sensor Y offset by the following expression (6). In expression (6), E1y is the sensor Y offset, M_P1y is the Y coordinate of the first reference point M_P1, and DM_P1y is the designed Y coordinate of the first reference point M_P1.

$$E1Y = M\_P1y - DM\_P1y \quad (6)$$

The Y coordinate M_P1y of the first reference point M_P1 may be calculated by the above-described expression (2).

The sensor Z offset calculation processor 133 causes the grasper 42 to contact the detection sensor 76 from above the tool sensor 76 in the state where the grasper 42 does not grasp the detection tool 7, and thus detects a Z coordinate of the tool sensor 76. The sensor Z offset calculation processor 133 calculates the sensor Z offset by the following expression (7). In expression (7), E1z is the sensor Z offset, TSz is the actual Z coordinate of the tool sensor 76, and DTSz is the designed Z coordinate of the top surface of the tool sensor 76.

$$E1z = TSz - DTSz \quad (7)$$

As described above, the sensor X offset, the sensor Y offset and the sensor Z offset are calculated. Thus, the sensor offset, which is the offset of the tool sensor 76, is calculated. The sensor X offset, the sensor Y offset and the sensor Z offset are stored on the storage 81. To perform cutting, the movement control processor 87 (see FIG. 7) controls the movement mechanism 90 based on the calculated sensor offset to move the processing tool 6 that is grasped by the grasper 42. As a result, the processing tool 6 that is grasped by the grasper 42 contacts an appropriate position of the tool sensor 76, and thus the processing tool 6 is detected properly.

Next, in step S105 in FIG. 10, the stocker offset calculation processor 86 calculates the stocker offset, which is an offset of each of the stockers 74 (see FIG. 5). In the following description, the items regarding the plurality of stockers 74 will be represented by reference signs with numeral of 1 through 6 in the parentheses, sequentially from the stocker 74 closest to the first reference point M_P1. In this example, the stocker offset of each stocker $74_{(i)}$ is represented by $E2_{(i)}$. In this preferred embodiment, i is 1 or greater and 6 or less. The stocker offset $E2_{(i)}$ includes a stocker X offset, which is a stocker offset in the X-axis direction, a stocker Y offset, which is a stocker offset in the Y-axis direction, and a stocker Z offset, which is a stocker offset in the Z-axis direction. Hereinafter, a procedure to calculate each of the stocker X offset, the stocker Y offset and the stocker Z offset will be described in detail.

In this preferred embodiment, as shown in FIG. 8, the stocker offset calculation processor 86 includes a stocker X offset calculation processor 141, a stocker Y offset calculation processor 142, and a stocker Z offset calculation processor 143. The stocker X offset calculation processor 141 calculates the stocker X offset. The stocker Y offset calculation processor 142 calculates the stocker Y offset. The stocker Z offset calculation processor 143 calculates the stocker Z offset. In this preferred embodiment, the storage 81 has, stored thereon in advance, the distance from the first reference point M_P1 to the center of the stocker $74_{(i)}$, and designed X coordinate, Y coordinate and Z coordinate of the second reference point M_P2.

First, the stocker X offset calculation processor 141 calculates the stocker X offset of the stocker $74_{(i)}$ by the following expression (8). In expression (8), $E2x_{(i)}$ is the stocker X offset of the stocker $74_{(i)}$, M_P1x is the X coordinate of the first reference point M_P1, M_P2x is the X coordinate of the second reference point M_P2, DM_P1x is the designed X coordinate of the first reference point M_P1, DM_P2x is the designed X coordinate of the second reference point M_P2, and $D_{(i)}$ is the distance from the first reference point M_P1 to the center of the stocker $74_{(i)}$.

$$E2x_{(i)} = (M\_P1x + ((M\_P2x - M\_P1x)/(DM\_P2x - DM\_P1x)) \times D_{(i)}) - (DM\_P1x + D_{(i)}) \quad (8)$$

The stocker Y offset calculation processor 142 calculates the stocker Y offset by the following expression (9). In expression (9), $E2y_{(i)}$ is the stocker Y offset of the stocker $74_{(i)}$, M_P1y is the Y coordinate of the first reference point M_P1, M_P2y is the Y coordinate of the second reference point M_P2, M_P1x is the X coordinate of the first reference point M_P1, M_P2x is the X coordinate of the second reference point M_P2, DM_P1y is the designed Y coordinate of the first reference point M_P1, and $D_{(i)}$ is the distance from the first reference point M_P1 to the center of the stocker $74_{(i)}$.

$$E2y_{(i)} = (M\_P1y + ((M\_P2y - M\_P1y)/(M\_P2x - M\_P1x)) \times D_{(i)}) - DM\_P1y \quad (9)$$

The stocker Z offset calculation processor 143 calculates the stocker Z offset by the following expression (10). In expression (10), $E2z_{(i)}$ is the stocker Z offset of the stocker $74_{(i)}$, M_P1z is the Z coordinate of the first reference point M_P1, M_P2z is the Z coordinate of the second reference point M_P2, M_P1x is the X coordinate of the first reference point M_P1, M_P2x is the X coordinate of the second reference point M_P2, DM_P1z is the designed Z coordinate of the first reference point M_P1, and $D_{(i)}$ is the distance from the first reference point M_P1 to the center of the stocker $74_{(i)}$.

$$E2z_{(i)}=(M\_P1z+((M\_P2z-M\_P1z)/(M\_P2x-M\_P1x))\times D_{(i)})-DM\_P1z \quad (10)$$

As described above, the stocker X offset, the stocker Y offset and the stocker Z offset are calculated. Thus, the stocker offset, which is an offset of each stocker $74_{(i)}$, is calculated. To perform cutting, the movement control processor 87 (see FIG. 7) controls the movement mechanism 90 based on the calculated stocker offset to move the grasper 42. As a result, the processing tool that is grasped by the grasper 42 is accommodated at an appropriate position of the corresponding stocker 74, and the processing tool 6 accommodated in the stocker 74 is properly grasped by the grasper 42.

As described above, in this preferred embodiment, referring to FIG. 5, the actual position of the first reference point M_P1 on the top surface of the first protrusion 78a provided in the magazine main body 72 of the magazine 70, and the actual position of the second reference point M_P2 on the top surface of the second protrusion 78b provided in the magazine main body 72, are detected. An inclination of the magazine main body 72 is obtained from the two points, namely, the first reference point M_P1 and the second reference point M_P2. Therefore, the assembling error of the magazine main body 72 is calculated, and also the sensor offset and the stocker offset are calculated, from the first reference point M_P1 and the second reference point M_P2. Thus, to perform cutting, the movement control processor 87 controls the movement mechanism 90 in consideration of the sensor offset, so that the processing tool 6 grasped by the grasper 42 is properly detected by the tool sensor 76. To perform cutting, the movement control processor 87 controls the movement mechanism 90 in consideration of the stocker offset, so that the processing tool 6 accommodated in the stocker 74 is properly grasped by the grasper 42, and also the processing tool 6 grasped by the grasper 42 is properly accommodated in the stocker 74. Since the grasper 42 grasps the processing tool 6 at an appropriate position, the processing target 5 is cut into a desired shape even if an assembling error of the magazine 70 occurs.

In this preferred embodiment, as shown in FIG. 5, the first protrusion 78a is circular or substantially circular. The first reference point detection processor 83 detects the first measurement point M1_X1 and the second measurement point M1_X2, which have the same Y coordinate as each other, and the third measurement point M1_Y1 and the fourth measurement point M1_Y2, which have the same X coordinate as each other, and thus detects the X coordinate, the Y coordinate and the Z coordinate of the first reference point M_P1. In this manner, the X coordinate, the Y coordinate and the Z coordinate of the first reference point M_P1 are calculated by use of a smaller number of points on the outer circumferential surface of the first protrusion 78a.

In this preferred embodiment, the second protrusion 78b is circular or substantially circular. The second reference point detection processor 84 detects the fifth measurement point M2_X1 and the sixth measurement point M2_X2, which have the same Y coordinate as each other, and the seventh measurement point M2_Y1 and the eighth measurement point M2_Y2, which have the same X coordinate as each other, and thus detects the X coordinate, the Y coordinate and the Z coordinate of the second reference point M_P2. In this manner, the X coordinate, the Y coordinate and the Z coordinate of the second reference point M_P2 are calculated by use of a smaller number of points on the outer circumferential surface of the second protrusion 78b.

In this preferred embodiment, the sensor X offset calculation processor 131 uses the above-described expression (5) to calculate the sensor X offset, which is the offset of the tool sensor 76 in the X-axis direction. The sensor Y offset calculation processor 132 uses the above-described expression (6) to calculate the sensor Y offset, which is the offset of the tool sensor 76 in the Y-axis direction. The sensor Z offset calculation processor 133 uses the above-described expression (7) to calculate the sensor Z offset, which is the offset of the tool sensor 76 in the Z-axis direction. In this manner, expressions (5) through (7) are usable to calculate the sensor X offset, the sensor Y offset and the sensor Z offset. Since the sensor X offset, the sensor Y offset and the sensor Z offset are calculated, the position of the tool sensor 76 is corrected three-dimensionally. Therefore, even if an assembling error of the magazine 70 occurs, the processing tool 6 grasped by the grasper 42 is detected by the tool sensor 76 more properly.

In this preferred embodiment, the stocker X offset calculation processor 141 uses the above-described expression (8) to calculate the stocker X offset, which is the stocker offset in the X-axis direction. The stocker Y offset calculation processor 142 uses the above-described expression (9) to calculate the stocker Y offset, which is the stocker offset in the Y-axis direction. The stocker Z offset calculation processor 143 uses the above-described expression (10) to calculate the stocker Z offset, which is the stocker offset in the Z-axis direction. In this manner, expressions (8) through (10) are usable to calculate the stocker X offset, the stocker Y offset and the stocker Z offset. Since the stocker X offset, the stocker Y offset and the stocker Z offset are calculated, the position of the stoker 74 is corrected three-dimensionally. Therefore, even if an assembling error of the magazine 70 occurs, the processing tool 6 accommodated in the stocker 74 is properly grasped by the grasper 42, and the processing tool 6 grasped by the grasper 42 is properly accommodated in the stocker 74.

In this preferred embodiment, the eccentric offset calculation processor 82 calculates the eccentric offset. The sensor offset calculation processor 85 calculates the sensor offset from the first reference point M_P1 and the second reference point M_P2 detected based on the eccentric offset. The stocker offset calculation processor 86 calculates the stocker offset from the first reference point M_P1 and the second reference point M_P2 detected based on the eccentric offset. Therefore, even if the grasper 42 does not properly grasp the detection tool 7, the orientation of the detection tool 7 grasped by the grasper 42 may be corrected based on the eccentric offset, and thus the first reference point M_P1 and the second reference point M_P2 are properly calculated. Thus, the sensor offset and the stocker offset are obtained more properly.

In this preferred embodiment, as shown in FIG. 6, the level of the top surface of the first protrusion 78a and the level of the top surface of the second protrusion 78b are equal to each other. Therefore, the Z coordinate of the first reference point M_P1 at the top surface of the first protrusion 78a and the Z coordinate of the second reference point M_P2 at the top surface of the second protrusion 78b are the same as each other. This shortens the processing time of the controller 80.

In this preferred embodiment, as shown in FIG. 5, the stockers 74, the tool sensor 76, the first protrusion 78a and the second protrusion 78b are arrayed in the X-axis direction. Therefore, as seen in a plan view, the stockers 74 and the tool sensor 76 are located on a straight line connecting the first reference point M_P1 on the first protrusion 78a and the second reference point M_P2 on the second protrusion 78b to each other. Therefore, the actual positions of the stockers 74 and the tool sensor 76 are easily calculated from the actual positions of the first reference point M_P1 and the second reference point M_P2.

In this preferred embodiment, as seen in a plan view, the stockers 74 are located between the first protrusion 78a and the second protrusion 78b. Therefore, as compared with, for example, a magazine in which the stockers 74 are located to the left of the first protrusion 78a or to the right of the second protrusion 78b, the positions of the stockers 74 are calculated more precisely from the actual positions of the first reference point M_P1 and the second reference point M_P2.

Preferred Embodiment 2

Now, a cutting device 200 according to preferred embodiment 2 of the present invention will be described. The basic structure of the cutting device 200 in this preferred embodiment is same as that of the cutting device 100 in preferred embodiment 1. Thus, the same components as those described above will bear the same reference signs, and the descriptions thereof may be omitted optionally.

Figure 14:
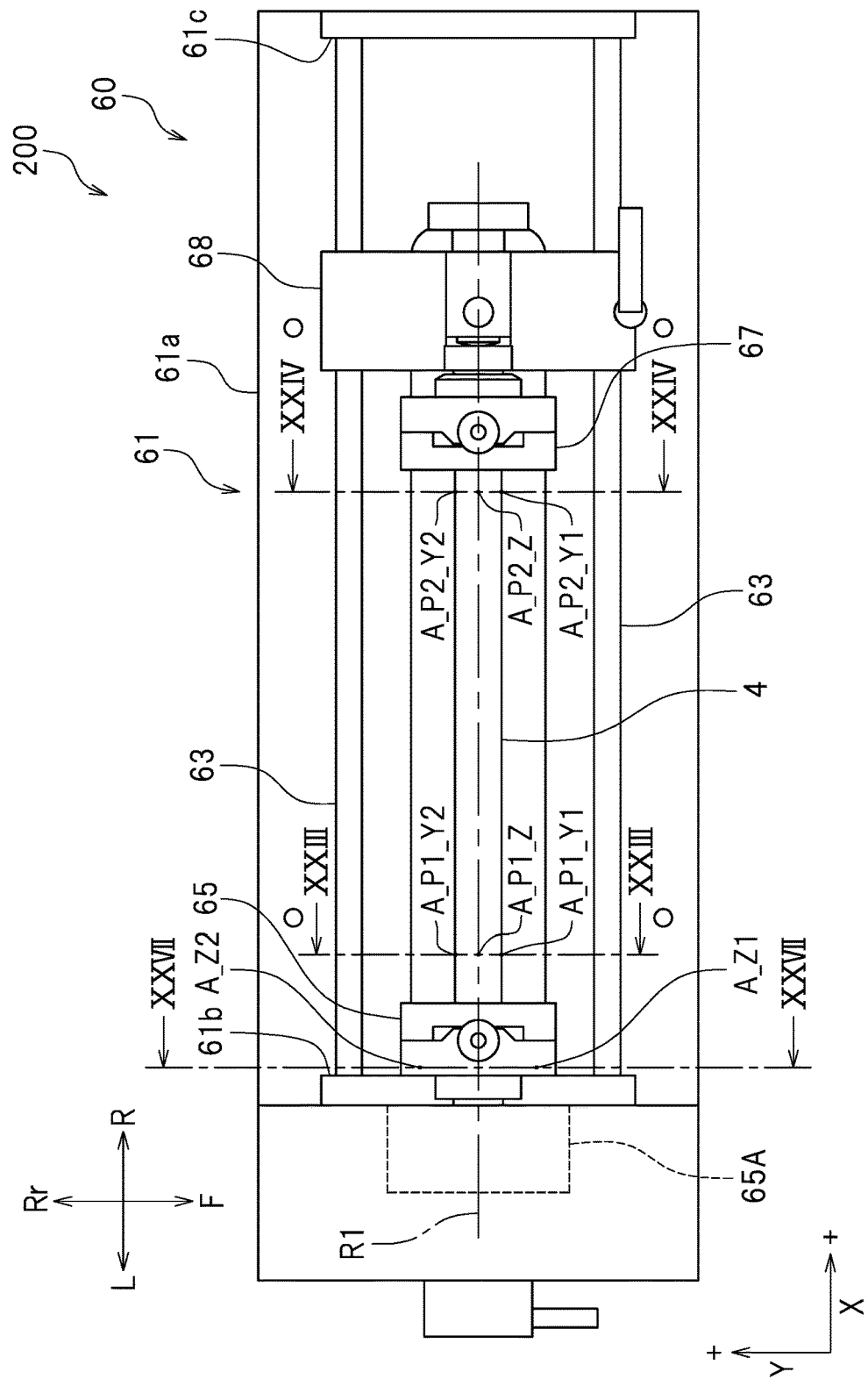
FIG. 14 is a plan view of a rotation mechanism in preferred embodiment 2 of the present invention.
Figure 15:
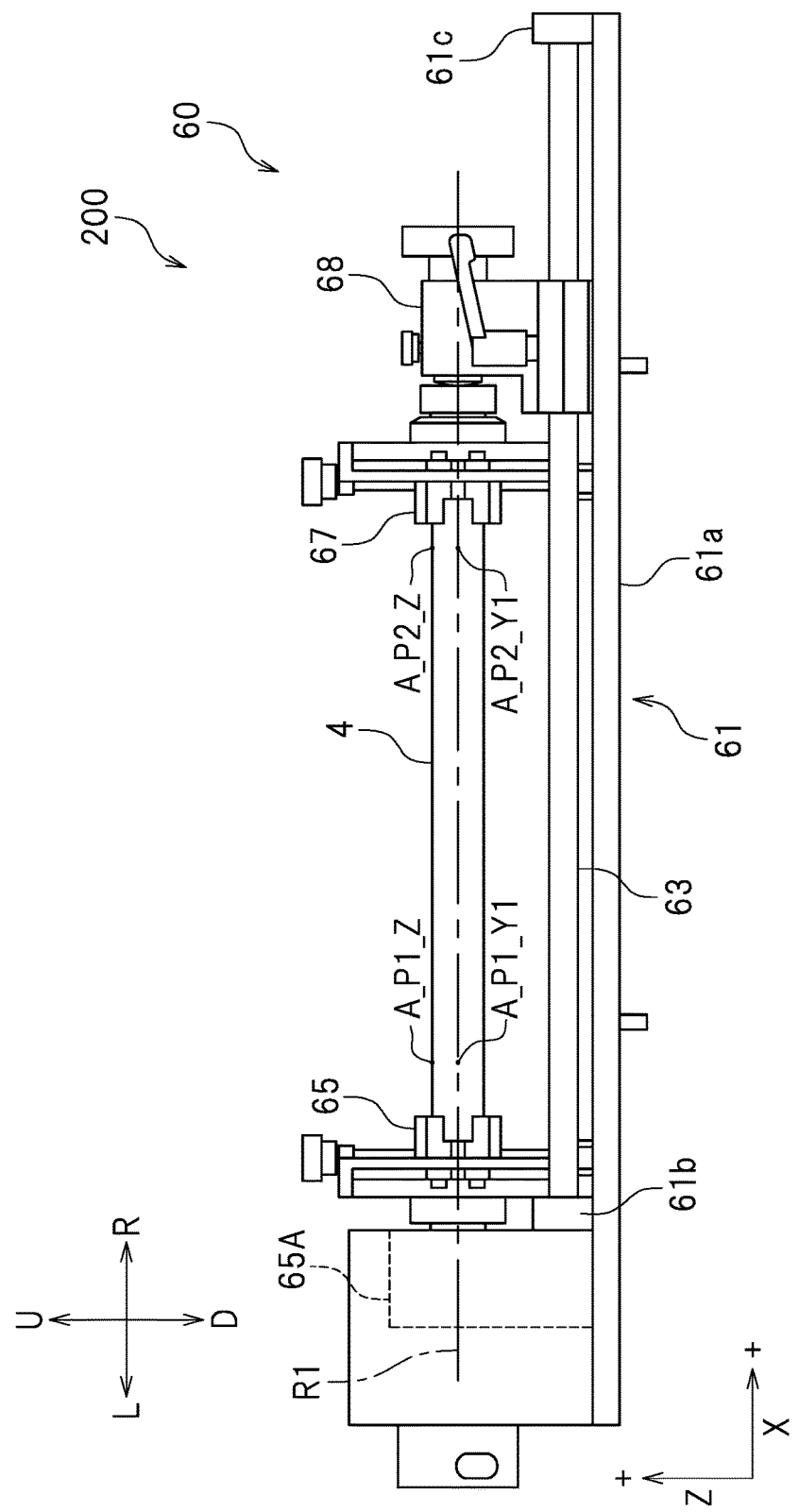
FIG. 15 is a front view of the rotation mechanism in preferred embodiment 2 of the present invention.
Figure 16:
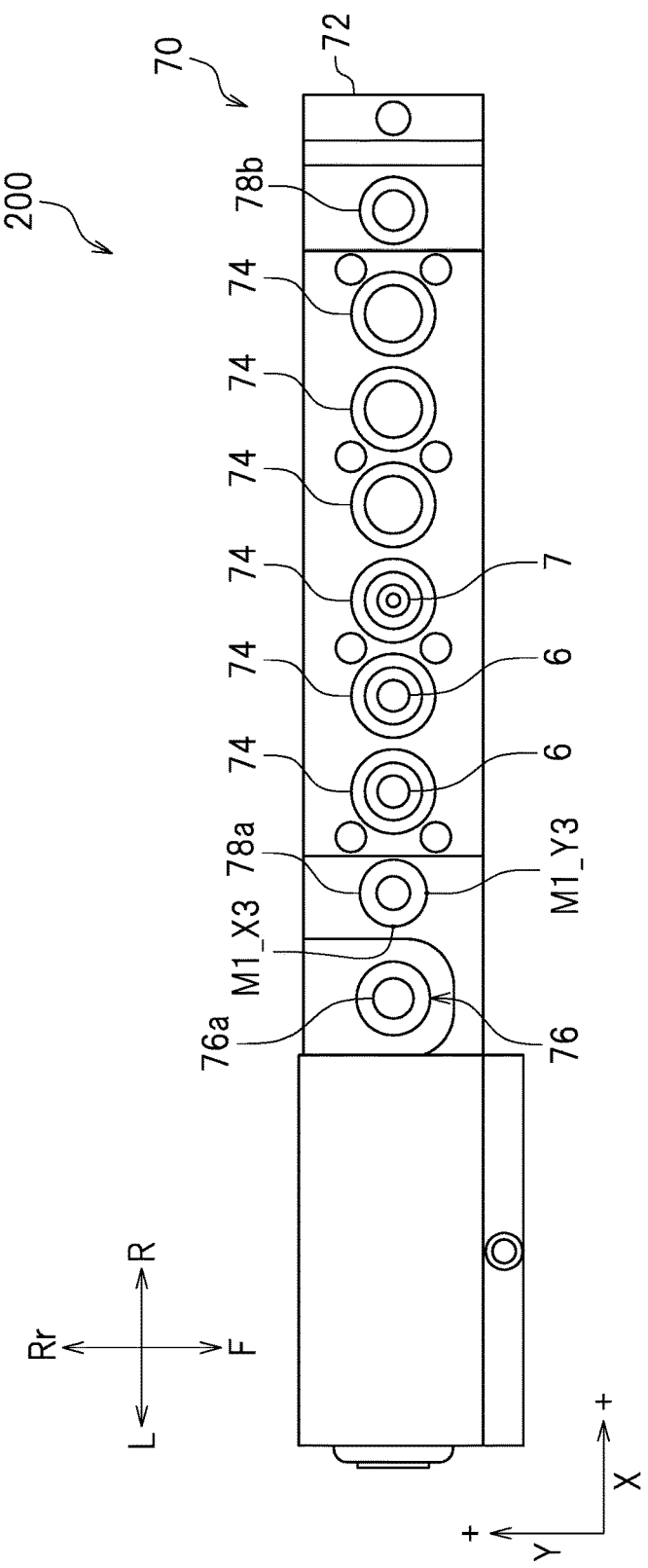
FIG. 16 is a plan view of a magazine in preferred embodiment 2 of the present invention.

FIG. 14 is a plan view of the rotation mechanism 60 in preferred embodiment 2. FIG. 15 is a front view of the rotation mechanism 60. FIG. 16 is a plan view of the magazine 70. As shown in FIG. 14 through 16, the cutting device 200 in this preferred embodiment includes the rotation mechanism 60 and the magazine 70.

Figure 17:
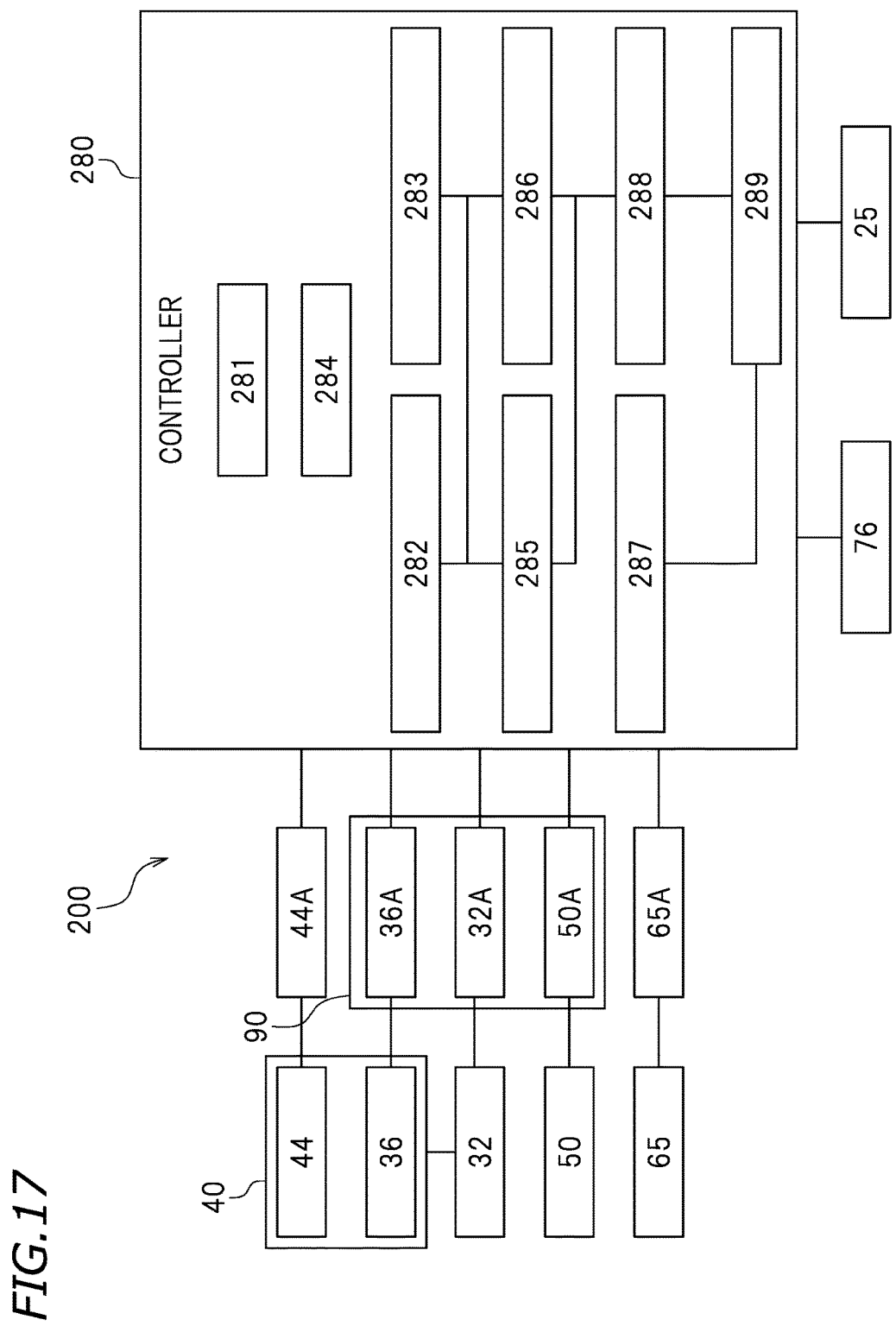
FIG. 17 is a block diagram of a cutting device in preferred embodiment 2 of the present invention.

FIG. 17 is a block diagram of the cutting device 200 in this preferred embodiment. As shown in FIG. 17, the cutting device 200 includes a controller 280. The controller 280 is a device that performs control on cutting and detects an actual position of the rotation mechanism 60 (see FIG. 14). The controller 280 includes a microcomputer, and includes a central processing unit (hereinafter, referred to as a "CPU"), a ROM storing a program and the like executable by the CPU, a RAM and the like. In this example, the program stored on the microcomputer is used to perform control on cutting, and control of adjusting the position of each of the components.

Figure 18:
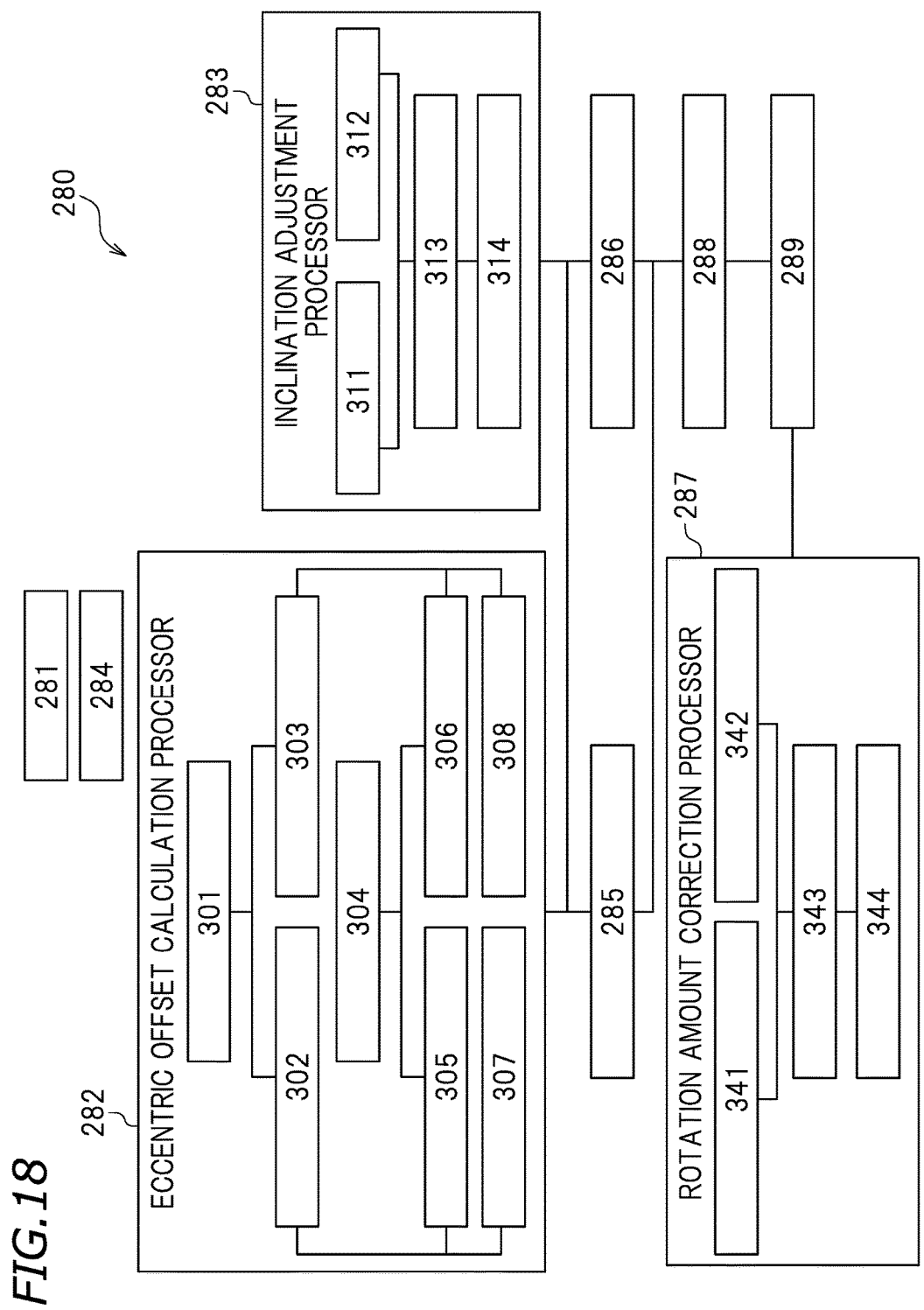
FIG. 18 is a block diagram of a controller.
Figure 19:
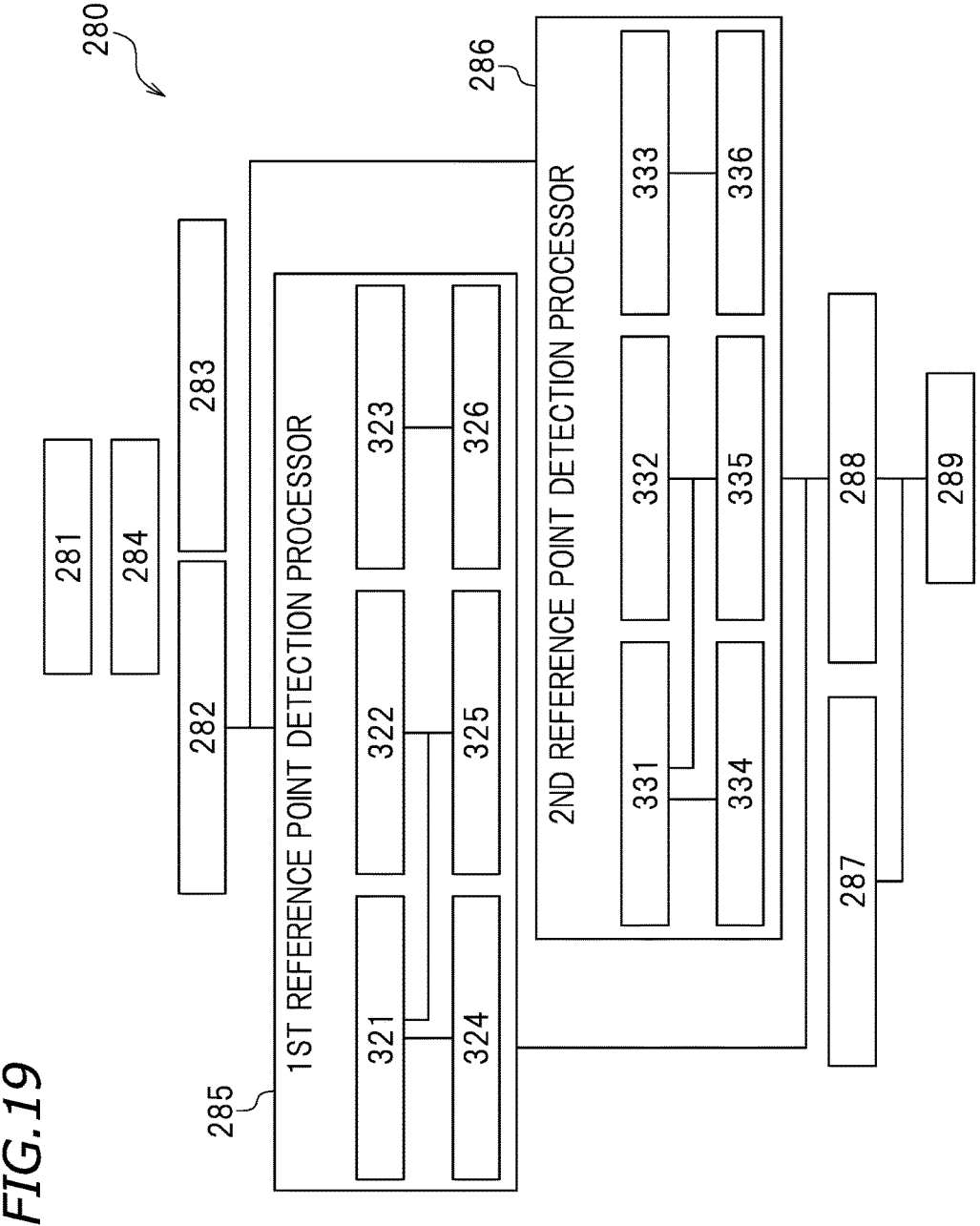
FIG. 19 is a block diagram of the controller.

FIG. 18 and FIG. 19 are each a block diagram of the controller 280. In this preferred embodiment, the controller 280 includes a storage 281, an eccentric offset calculation processor 282, an inclination adjustment processor 283, a clamp rotation processor 284, a first reference point detection processor 285, a second reference point detection processor 286, a rotation amount correction processor 287, a rotation axis offset calculation processor 288, and a movement control processor 289. The above-listed components are each realized by one or at least two processors, and each include one or at least two processors. The above-listed components may be realized by software or hardware. For example, the above-listed components may each include a circuit.

In this preferred embodiment, the storage 281 of the controller 280 has a designed position of the rotation mechanism 60 stored thereon in advance. Namely, the storage 281 has, stored thereon in advance, designed positions of the first clamp 65 and the second clamp 67. The "positions" of the first clamp 65 and the second clamp 67 encompass the rotation angles of the first clamp 65 and the second clamp 67. These positions are specified by, for example, XYZ coordinates in an XYZ orthogonal coordinate system. There is no specific limitation on the origin of the XYZ orthogonal coordinate system. In this preferred embodiment, it is designed that the direction of an axis about which a component such as, for example, a processing target 5 held between the first clamp 65 and the second clamp 67 is rotated by the rotation mechanism 60 (hereinafter, such an axis will be referred to as a "rotation axis") is perpendicular to the rotation axis of the spindle 44 as seen in a front view. In this example, the direction of the rotation axis of the rotation mechanism 60 is the X-axis direction, and the direction of the rotation axis of the spindle 44 is the Z-axis direction. Based on the designed position of the rotation mechanism 60, the cutting device 200 causes the processing tool 6 grasped by the grasper 42 of the cutting head 40 to contact the processing target 5 held between the first clamp 65 and the second clamp 67 while rotating the processing target 5, and thus cuts the processing target 5.

However, during the attachment of the rotation mechanism 60 to the main body 10 of the cutting device 200, an assembling error of the rotation mechanism 60 to the main body 10 may occur. In the case where there is such an assembling error, the actual position of the rotation mechanism 60 may be different from the designed position of the rotation mechanism 60. For example, the actual position of the first clamp 65 or the second clamp 67 may be different from the designed position of the first clamp 65 or the second clamp 67. In the case where the actual position of the rotation mechanism 60 is different from the designed position of the rotation mechanism 60, the direction of the axis about which a component such as, for example, the processing target 5 is rotated by the rotation mechanism 60 (in this example, the rotation axis of the rotation mechanism 60) may be shifted from the designed direction. In such a case, the processing target 5 may not be cut into a desired shape.

Figure 20:
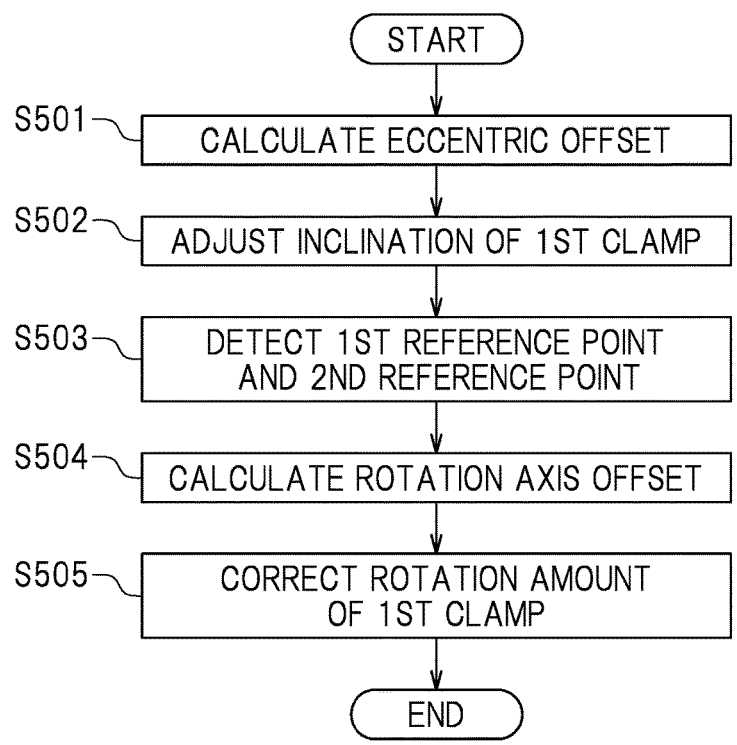
FIG. 20 is a flowchart showing a procedure to calculate a rotation axis offset.

In such a situation, in this preferred embodiment, when the rotation mechanism 60 is attached to the main body 10 of the cutting device 200, a rotation axis offset, which is a correction value on the rotation axis of the rotation mechanism 60 is calculated. Based on the rotation axis offset, the movement mechanism 90 is controlled. To perform cutting, the rotation axis offset is considered. FIG. 20 is a flowchart showing a procedure to calculate the rotation axis offset. Hereinafter, with reference to the flowchart in FIG. 20, a procedure to calculate the rotation axis offset will be described.

In this preferred embodiment, a first rotation reference position, which is a reference position to rotate a component such as, for example, the processing target 5 held between the first clamp 65 and the second clamp 67, is preset for the first clamp 65. A second rotation reference position, which is a reference position to rotate the grasper 42, is preset for the spindle 44. In this preferred embodiment, the storage 281 of the controller 280 has the first rotation reference position and the second rotation reference position stored thereon in advance. In the following description, the rotation angle of the first clamp 65 when the first clamp 65 is located at the first rotation reference position is 0°. Similarly, the rotation angle of the spindle 44 when the spindle 44 is located at the second rotation reference position is 0°. In this preferred embodiment, to calculate the rotation axis offset of the rotation mechanism 60, the detection tool 7 is grasped by the grasper 42 of the cutting head 40. To calculate the rotation axis offset of the rotation mechanism 60, a cylindrical detection jig 4 (see FIG. 14) is held between the first clamp 65 and the second claim 67. In this example, the detection tool 7 and the detection jig 4 are used to calculate the rotation axis offset of the rotation mechanism 60.

First, in step S501 in FIG. 20, the eccentric offset calculation processor 282 calculates an eccentric offset. In this preferred embodiment, like in preferred embodiment 1, the value to correct the error of the position of the detection tool 7 when the spindle 44 is rotated will be referred to as an "eccentric offset". The "eccentric offset" is a position difference between the detection tool 7 grasped by the grasper 42 when the rotation angle of the spindle 44 is 0° and the detection tool 7 grasped by the grasper 42 when the rotation angle of the spindle 44 is 180°. In this example, the "eccentric offset" includes an eccentric X offset and an eccentric Y offset, like in preferred embodiment 1.

Figure 21:
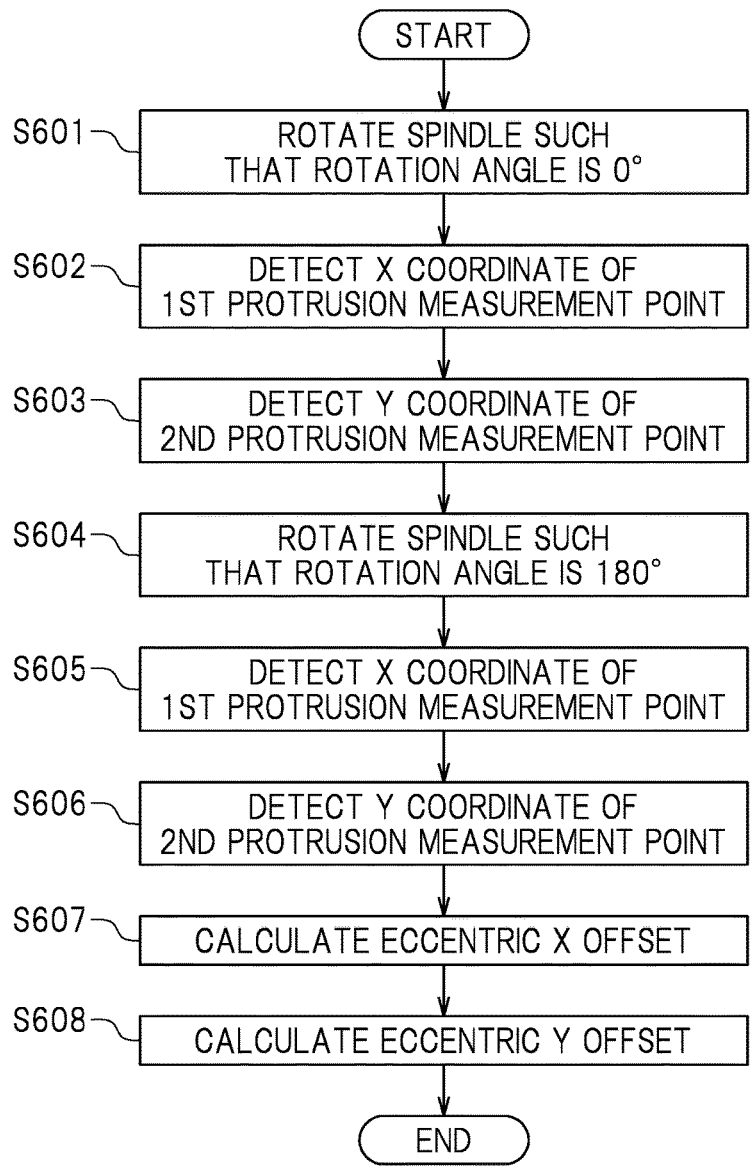
FIG. 21 is a flowchart showing a procedure to calculate an eccentric offset.

FIG. 21 is a flowchart showing a procedure to calculate the eccentric offset. In this preferred embodiment, the eccentric offset is calculated by the eccentric offset calculation processor 282 by the procedure shown in the flowchart of FIG. 21. In this example, as shown in FIG. 18, the eccentric offset calculation processor 282 includes a first spindle rotation processor 301, a first angle X detection processor 302, a first angle Y detection processor 303, a second spindle rotation processor 304, a second angle X detection processor 305, a second angle Y detection processor 306, an eccentric X offset calculation processor 307, and an eccentric Y offset calculation processor 308.

First, in step S601 in FIG. 21, the first spindle rotation processor 301 rotates the spindle 44 such that the rotation angle of the spindle 44 is 0° with respect to the second rotation reference position.

Next, in step S602, referring to FIG. 16, the first angle X detection processor 302 detects an X coordinate of a first protrusion measurement point M1_X3 when the rotation angle of the spindle 44 is 0°. The "first protrusion measurement point M1_X3" is a point that is on an outer circumferential surface of the first protrusion 78a and is at an end of the outer circumferential surface in the left-right direction X, namely, in the X-axis direction (in this example, the end is the left end). In this preferred embodiment, the first angle X detection processor 302 controls the movement mechanism 90 such that the detection tool 7 grasped by the grasper 42 contacts the first protrusion 78a, and thus detects the X coordinate of the first protrusion measurement point M1_X3. The X coordinate of the first protrusion measurement point M1_X3 detected in step S602 will be referred to as a "first eccentric X coordinate".

Next, in step S603 in FIG. 21, referring to FIG. 16, the first angle Y detection processor 303 detects a Y coordinate of a second protrusion measurement point M1_Y3 when the rotation angle of the spindle 44 is 0°. The "second protrusion measurement point M1_Y3" is a point that is on the outer circumferential surface of the first protrusion 78a and is at an end of the outer circumferential surface in the front-rear direction Y, namely, in the Y-axis direction (in this example, the end is the front end). In this preferred embodiment, the first angle Y detection processor 303 controls the movement mechanism 90 such that the detection tool 7 grasped by the grasper 42 contacts the first protrusion 78a, and thus detects the Y coordinate of the second protrusion measurement point M1_Y3. The Y coordinate of the second protrusion measurement point M1_Y3 detected in step S603 will be referred to as a "first eccentric Y coordinate".

Next, in step S604 in FIG. 21, the second spindle rotation processor 304 rotates the spindle 44 by 180° with respect to the second rotation reference position. A surface of the spindle 44 that faced the left side of the detection tool 7 before this step faces the right side of the detection tool 7 after this step. A surface of the spindle 44 that faced the front side of the detection tool 7 before this step faces the rear side of the detection tool 7 after this step.

Next, in step S605, the second angle X detection processor 305 detects the X coordinate of the first protrusion measurement point M1_X3 when the rotation angle of the spindle 44 is 180°. The procedure for the detection is substantially the same as that in step S602. The X coordinate of the first protrusion measurement point M1_X3 detected in step S605 will be referred to as a "second eccentric X coordinate".

Next, in step S606, the second angle Y detection processor 306 detects the Y coordinate of the second protrusion measurement point M1_Y3 when the rotation angle of the spindle 44 is 180°. The procedure for the detection is substantially the same as that in step S603. The Y coordinate of the second protrusion measurement point M1_Y3 detected in step S606 will be referred to as a "second eccentric Y coordinate".

Next, in step S607, the eccentric X offset calculation processor 307 calculates the eccentric X offset, which is an eccentric offset in the X-axis direction, from the first eccentric X coordinate detected by the first angle X detection processor 302 and the second eccentric X coordinate detected by the second angle X detection processor 305. In this preferred embodiment, the eccentric X offset calculation processor 307 sets a difference between the first eccentric X coordinate and the second eccentric X coordinate as the eccentric X offset.

Next, in step S608, the eccentric Y offset calculation processor 308 calculates the eccentric Y offset, which is an eccentric offset in the Y-axis direction, from the first eccentric Y coordinate detected by the first angle Y detection processor 303 and the second eccentric Y coordinate detected by the second angle Y detection processor 306. In this preferred embodiment, the eccentric Y offset calculation processor 308 sets a difference between the first eccentric Y coordinate and the second eccentric Y coordinate as the eccentric Y offset. As described above, the eccentric offset calculation processor 282 calculates the eccentric X offset and the eccentric Y offset to calculate the eccentric offset.

The eccentric offset is calculated in step S501 in FIG. 20. After this, in step S502, the inclination adjustment processor 283 adjusts an inclination of the first clamp 65 when the rotation angle of the first clamp 65 is 0°. There may be a case where, for example, although the rotation angle of the first claim 65 is designed to be 0°, the actual rotation angle of the first claim 65 is not 0° due to an assembling error of the rotation mechanism 60. In such a case, the inclination of the first clamp 65 is adjusted in order to make the actual rotation angle of the first clamp 65 0°.

There is no specific limitation on the procedure to adjust the inclination of the first clamp 65. In this preferred embodiment, the inclination adjustment processor 283 executes the procedure shown in the flowchart of FIG. 22 to adjust the inclination of the first clamp 65 when the rotation angle of the first clamp 65 is 0°. In this preferred embodiment, as shown in FIG. 14, a first clamp reference point A_Z1 and a second clamp reference point A_Z2 are set on a top surface of the first clamp 65 when the rotation angle of the first clamp 65 is 0°. There is no specific limitation on the position of the first clamp reference point A_Z1 or the position of the second clamp reference point A_Z2. In this example, the first clamp reference point A_Z1 and the second clamp reference point A_Z2 are arrayed in the front-rear direction Y and have the same X coordinate as each other. The first clamp reference point A_Z1 is located to the front of the second clamp reference point A_Z2. The inclination adjustment processor 283 detects the actual positions of the first clamp reference point A_Z1 and the second clamp reference point A_Z2, and thus adjusts the inclination of the first clamp 65 when the rotation angle of the first clamp 65 is 0°. In this preferred embodiment, as shown in FIG. 18, the inclination adjustment processor 283 includes a first clamp reference point detection processor 311, a second clamp reference point detection processor 312, a clamp inclination calculation processor 313, and a clamp adjustment processor 314.

The storage 281 has, stored thereon in advance, a "clamp designed inclination", which is a designed inclination of the top surface of the first clamp 65 when the rotation angle of the first clamp 65 is 0° with respect to the first rotation reference position. In this example, the "clamp designed inclination" is perpendicular to the Z-axis direction.

Figure 22:
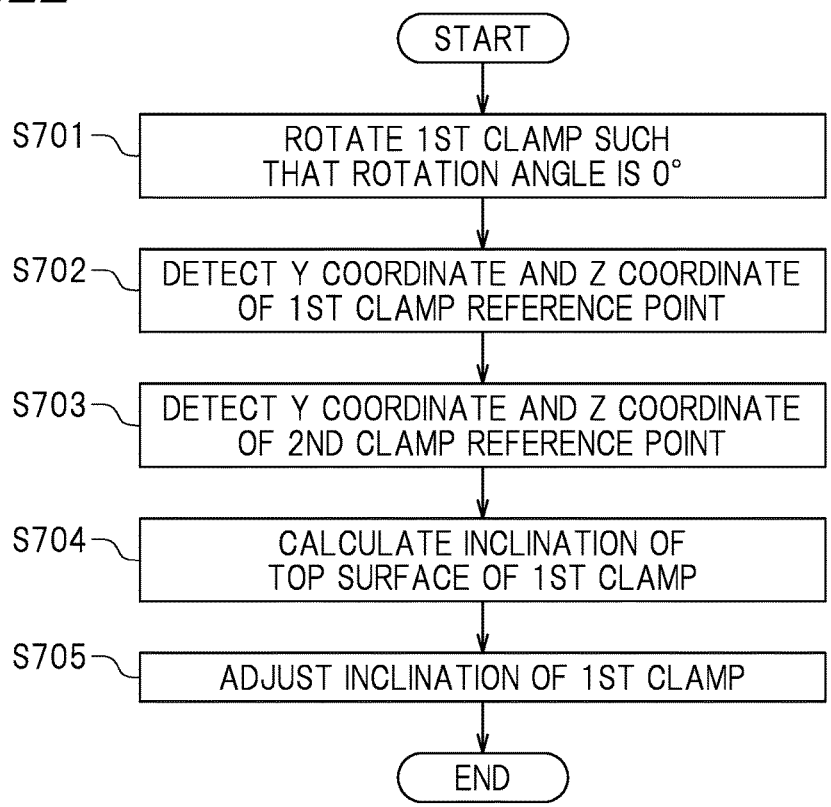
FIG. 22 is a flowchart showing a procedure for adjusting an inclination of a first clamp when the rotation angle thereof is 0°.

First, in S701 in FIG. 22, the inclination adjustment processor 283 rotates the first clamp 65 by the clamp rotation processor 284 such that the rotation angle of the first clamp 65 is 0°.

Next, in step S702, referring to FIG. 14, the first clamp reference point detection processor 311 detects a Y coordinate and a Z coordinate of the first clamp reference point A_Z1 when the rotation angle of the first clamp 65 is 0°. Specifically, the first clamp reference point detection processor 311 controls the movement mechanism 90 such that the detection tool 7 grasped by the grasper 42 contacts the first clamp reference point A_Z1 on the top surface of the first clamp 65 from above the first clamp 65. At this point, the first clamp reference point detection processor 311 detects a Y coordinate and a Z coordinate of a tip of the detection tool 7 when the first clamp reference point A_Z1 of the first clamp 65 contacts the detection tool 7, as the Y coordinate and the Z coordinate of the first clamp reference point A_Z1. In this example, the Y coordinate of the first clamp reference point A_Z1 when the rotation angle of the first clamp 65 is 0° will be referred to as a "first clamp Y coordinate". The Z coordinate of the first clamp reference point A_Z1 when the rotation angle of the first clamp 65 is 0° will be referred to as a "first clamp Z coordinate".

Next, in step S703 in FIG. 22, referring to FIG. 14, the second clamp reference point detection processor 312 detects a Y coordinate and a Z coordinate of the second clamp reference point A_Z2 when the rotation angle of the first clamp 65 is 0°. In this example, the second clamp reference point detection processor 312 controls the movement mechanism 90 such that the detection tool 7 grasped by the grasper 42 contacts the second clamp reference point A_Z2 on the top surface of the first clamp 65 from above the first clamp 65. At this point, the second clamp reference point detection processor 312 detects a Y coordinate and a Z coordinate of the tip of the detection tool 7 when the second clamp reference point A_Z2 of the first clamp 65 contacts the detection tool 7, as the Y coordinate and the Z coordinate of the second clamp reference point A_Z2. In this example, the Y coordinate of the second clamp reference point A_Z2 when the rotation angle of the first clamp 65 is 0° will be referred to as a "second clamp Y coordinate". The Z coordinate of the second clamp reference point A_Z2 when the rotation angle of the first clamp 65 is 0° will be referred to as a "second clamp Z coordinate".

Next, in step S704 in FIG. 22, the clamp inclination calculation processor 313 calculates a clamp actual inclination, which is an actual inclination of the top surface of the first clamp 65. The clamp inclination calculation processor 313 uses the first clamp Y coordinate, the first clamp Z coordinate, the second clamp Y coordinate and the second clamp Z coordinate detected in steps S702 and S703 to calculate the clamp actual inclination. In this preferred embodiment, the clamp actual inclination is an inclination of a line connecting the first clamp reference point A_Z1 and the second clamp reference point A_Z2 on a YZ plane.

In this example, where the clamp actual inclination is SL1, the first clamp Y coordinate is $A\_Z1y$, the first clamp Z coordinate is $A\_Z1z$, the second clamp Y coordinate is $A\_Z2y$, and the second clamp Z coordinate is $A\_Z2z$, the clamp inclination calculation processor 313 calculates the clamp actual inclination SL1 by the following expression (11). The unit of the clamp actual inclination SL1 is rad. There is no specific limitation on the unit of the clamp actual inclination SL1.

$$SL1 = \tan^{-1} \frac{A\_Z1z - A\_Z2z}{A\_Z2y - A\_Z1y} \qquad (11)$$

Next, in step S705 in FIG. 22, the clamp adjustment processor 314 adjusts the position of the first clamp 65 when the rotation angle of the first clamp 65 is 0°. In this example, the clamp adjustment processor 314 compares the clamp actual inclination calculated by the above-described expression (11) and the clamp designed inclination stored on the storage 281, and rotates the first clamp 65 such that the clamp actual inclination is adjusted to be the clamp designed inclination. The clamp adjustment processor 314 uses the clamp actual inclination to adjust the rotation angle of the first clamp 65 such that the top surface of the first clamp 65 is perpendicular to the axial direction of the spindle 44. In this example, the rotation position of the first clamp 65 that is adjusted by the clamp adjustment processor 314 is the designed first rotation reference position of the first clamp 65.

Figure 23:
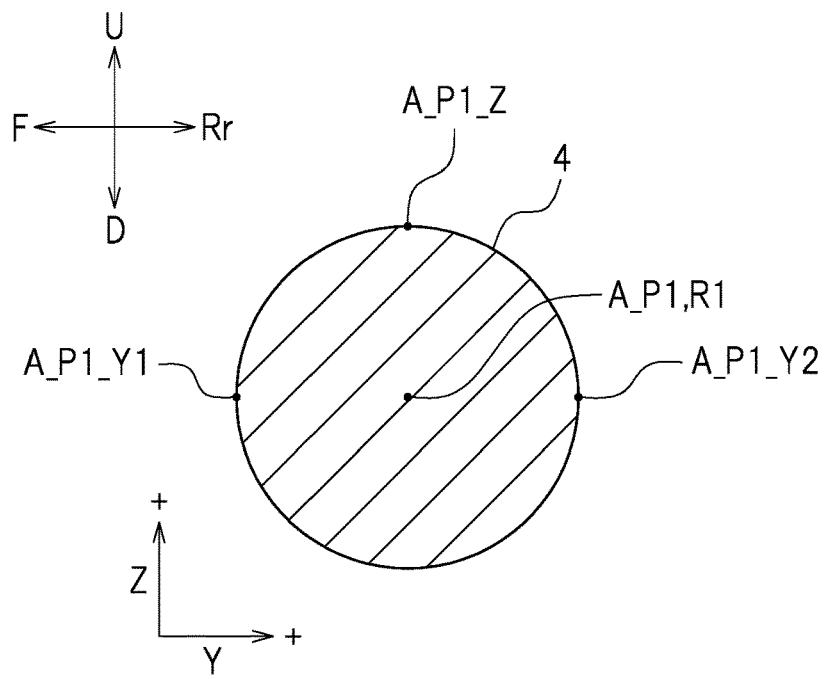
FIG. 23 is a cross-sectional view of a detection jig taken along line XXIII-XXIII in FIG. 14.
Figure 24:
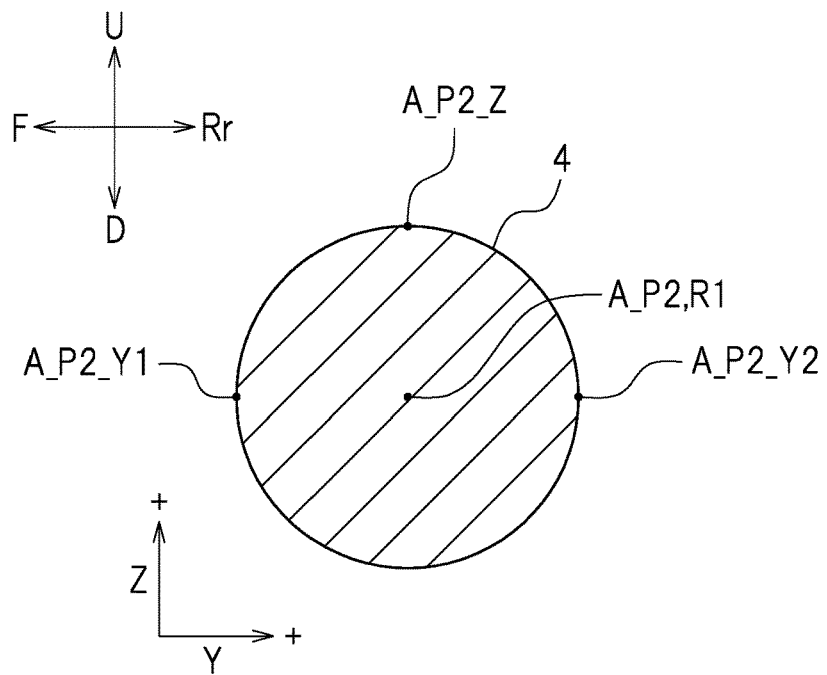
FIG. 24 is a cross-sectional view of the detection jig taken along line XXIV-XXIV in FIG. 14.

As described above, the inclination of the first clamp 65 when the rotation angle of the first clamp 65 is 0° is adjusted. After this, in step S503 in FIG. 20, the first reference point A_P1 and the second reference point A_P2 are detected. FIG. 23 is a cross-sectional view of the detection jig 4 taken along line XXIII-XXIII in FIG. 14. FIG. 24 is a cross-sectional view of the detection jig 4 taken along line XXIV-XXIV in FIG. 14. As shown in FIG. 23 and FIG. 24, the first reference point A_P1 and the second reference point A_P2 are points on a rotation axis R1 of the rotation mechanism 60. The first reference point A_P1 and the second reference point A_P2 are away from each other by a predetermined distance. In this example, the first reference point A_P1 is closer to the first clamp 65 than the second reference point A_P2 is. There is no specific limitation on the position of the first reference point A_P1 or the second reference point A_P2.

In step S503 in FIG. 20, the first reference point detection processor 285 detects the actual position of the first reference point A_P1 on the rotation axis R1. In this example, the first reference point detection processor 285 controls the movement mechanism 90 such that the detection tool 7 grasped by the grasper 42 contacts the detection jig 4 held between the first clamp 65 and the second clamp 67, and thus detects the actual position of the first reference point A_P1.

The second reference point detection processor 286 detects the actual position of the second reference point A_P2 on the rotation axis R1. In this example, the second reference point detection processor 286 controls the movement mechanism 90 such that the detection tool 7 grasped by the grasper 42 contacts the detection jig 4 held between the first clamp 65 and the second clamp 67, and thus detects the actual position of the second reference point A_P2. There is no specific limitation on the procedure to detect the first reference point A_P1 and the second reference point A_P2. In this preferred embodiment, the procedure shown in the flowchart of FIG. 25 is executed to calculate the first reference point A_P1 and the second reference point A_P2.

In this example, as shown in FIG. 19, the first reference point detection processor 285 includes a first measurement point detection processor 321, a second measurement point detection processor 322, a third measurement point detection processor 323, a first reference point X calculation processor 324, a first reference point Y calculation processor 325, and a first reference point Z calculation processor 326. The second reference point detection processor 286 includes a fourth measurement point detection processor 331, a fifth measurement point detection processor 332, a sixth measurement point detection processor 333, a second reference point X calculation processor 334, a second reference point Y calculation processor 335, and a second reference point Z calculation processor 336.

In this preferred embodiment, the storage 281 has a rotation axis designed position, which is a designed position of the rotation axis R1, stored thereon in advance. For example, the designed position of the rotation axis R1 is in a direction extending in the X-axis direction.

Figure 25:
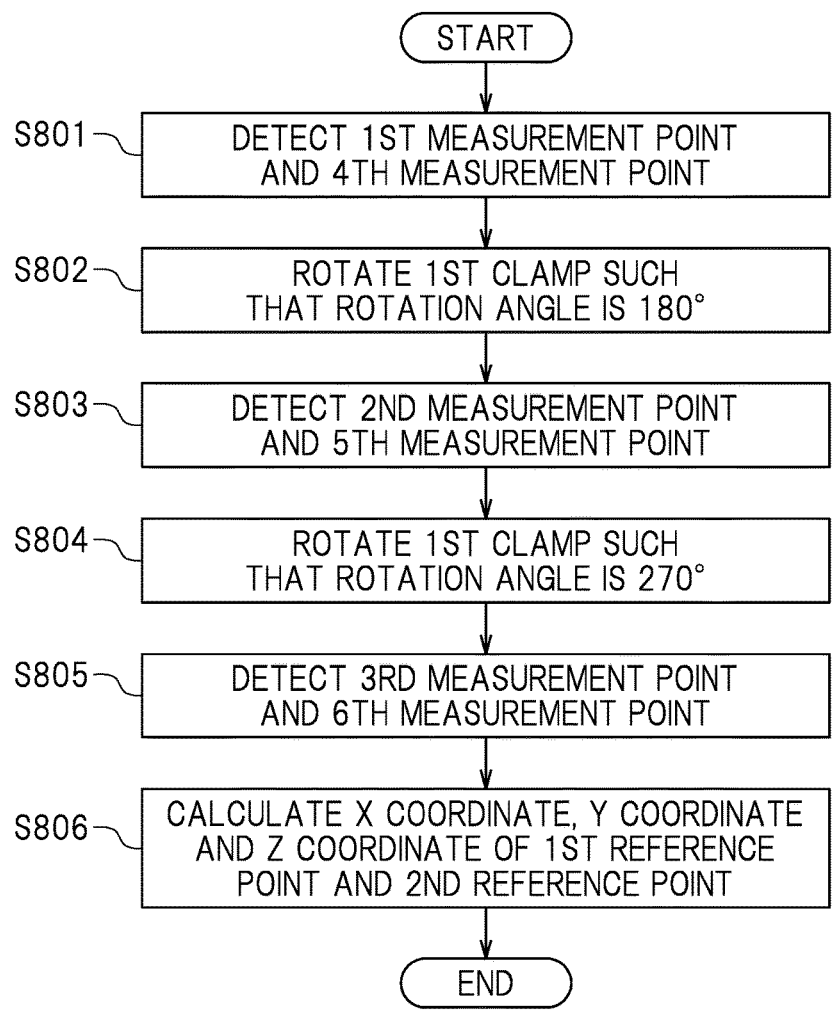
FIG. 25 is a flowchart showing a procedure for detecting a first reference point and a second reference point.

Step S801 in FIG. 25 is performed after the first clamp 65 is rotated such that the rotation angle thereof is 0°. In step S801, the first measurement point detection processor 321 detects a first measurement point A_P1_Y1 (see FIG. 14) when the rotation angle of the first clamp 65 is 0°. The fourth measurement point detection processor 331 detects a fourth measurement point A_P2_Y1 (see FIG. 14) when the rotation angle of the first clamp 65 is 0°. As shown in FIG. 23, the "first measurement point A_P1_Y1" is a point that is on an outer circumferential surface of the detection jig 4 and has an X coordinate same as that of the first reference point A_P1. As shown in FIG. 24, the "fourth measurement point A_P2_Y1" is a point that is on the outer circumferential surface of the detection jig 4 and has an X coordinate same as that of the second reference point A_P2. As shown in FIG. 14, the first measurement point A_P1_Y1 and the fourth measurement point A_P2_Y1 are each at an end of the detection jig 4 on the negative side of the Y-axis direction, and are each the foremost point of the detection jig 4.

The first measurement point detection processor 321 controls the movement mechanism 90 such that the detection tool 7 grasped by the grasper 42 contacts the detection jig 4 at the designed X coordinate of the first measurement point A_P1_Y1 from the front of the detection jig 4. At this point, the first measurement point detection processor 321 sets the X coordinate of the detection tool 7 when the detection tool 7 contacts the outer circumferential surface of the detection jig 4 as the actual X coordinate of the first measurement point A_P1_Y1, and sets the Y coordinate of the detection tool 7 when the detection tool 7 contacts the outer circumferential surface of the detection jig 4 as the actual Y coordinate of the first measurement point A_P1_Y1. Similarly, the fourth measurement point detection processor 331 controls the movement mechanism 90 such that the detection tool 7 grasped by the grasper 42 contacts the detection jig 4 at the designed X coordinate of the fourth measurement point A_P2_Y1 from the front of the detection jig 4. At this point, the fourth measurement point detection processor 331 sets the X coordinate of the detection tool 7 when the detection tool 7 contacts the outer circumferential surface of the detection jig 4 as the actual X coordinate of the fourth measurement point A_P2_Y1, and sets the Y coordinate of the detection tool 7 when the detection tool 7 contacts the outer circumferential surface of the detection jig 4 as the actual Y coordinate of the fourth measurement point A_P2_Y1.

Next, in step S802 in FIG. 25, the clamp rotation processor 284 rotates the first clamp 65 such that the rotation angle thereof is 180°. In step S803, the second measurement point detection processor 322 detects a second measurement point A_P1_Y2 (see FIG. 14) when the rotation angle of the first clamp 65 is 180°. The fifth measurement point detection processor 332 detects a fifth measurement point A_P2_Y2 (see FIG. 14) when the rotation angle of the first clamp 65 is 180°. As shown in FIG. 23, the "second measurement point A_P1_Y2" is a point that is on the outer circumferential surface of the detection jig 4 and has an X coordinate same as that of the first reference point A_P1 and that of the first measurement point A_P1_Y1. As shown in FIG. 24, the "fifth measurement point A_P2_Y2" is a point that is on the outer circumferential surface of the detection jig 4 and has an X coordinate same as that of the second reference point A_P2 and that of the fourth measurement point A_P2_Y1. As shown in FIG. 14, the second measurement point A_P1_Y2 and the fifth measurement point A_P2_Y2 are each at an end of the detection jig 4 on the positive side of the Y-axis direction, and are each the rearmost point of the detection jig 4.

In this preferred embodiment, the second measurement point detection processor 322 moves the detection tool 7 grasped by the grasper 42 to a position that is to the rear of the detection jig 4 held between the first clamp 65 and the second clamp 67. The second measurement point detection processor 322 controls the movement mechanism 90 such that the detection tool 7 grasped by the grasper 42 contacts the outer circumferential surface of the detection jig 4 at the designed X coordinate of the second measurement point A_P1_Y2. At this point, the second measurement point detection processor 322 sets the X coordinate of the detection tool 7 when the detection tool 7 contacts the outer circumferential surface of the detection jig 4 as the actual X coordinate of the second measurement point A_P1_Y2, and sets the Y coordinate of the detection tool 7 when the detection tool 7 contacts the outer circumferential surface of the detection jig 4 as the actual Y coordinate of the second measurement point A_P1_Y2. A portion of the detection jig 4 that contacts the detection tool 7 at the second measurement point A_P1_Y2 from the rear of the detection tool 7 when the rotation angle of the first clamp 65 is 180°, and a portion of the detection jig 4 that contacts the detection tool 7 at the first measurement point A_P1_Y1 when the rotation angle of the first clamp 65 is 0°, are the same as each other.

Similarly, the fifth measurement point detection processor 332 moves the detection tool 7 grasped by the grasper 42 to a position that is to the rear of the detection jig 4 held between the first clamp 65 and the second clamp 67. The fifth measurement point detection processor 332 controls the movement mechanism 90 such that the detection tool 7 grasped by the grasper 42 contacts the outer circumferential surface of the detection jig at the designed X coordinate of the fifth measurement point A_P2_Y2. At this point, the fifth measurement point detection processor 332 sets the X coordinate of the detection tool 7 when the detection tool 7 contacts the outer circumferential surface of the detection jig 4 as the actual X coordinate of the fifth measurement point A_P2_Y2, and sets the Y coordinate of the detection tool 7 when the detection tool 7 contacts the outer circumferential surface of the detection jig 4 as the actual Y coordinate of the fifth measurement point A_P2_Y2. A portion of the detection jig 4 that contacts the detection tool 7 at the fifth measurement point A_P2_Y2 from the rear of the detection tool 7 when the rotation angle of the first clamp 65 is 180°, and a portion of the detection jig 4 that contacts the detection tool 7 at the fourth measurement point A_P2_Y1 when the rotation angle of the first clamp 65 is 0°, are the same as each other.

Next, in step S804 in FIG. 25, the clamp rotation processor 284 rotates the first clamp 65 such that the rotation angle thereof is 270°. The rotation angle of the first clamp 65 of 270° refers to that the rotation angle of the first clamp 65 is 270° from the first rotation reference position counterclockwise as seen from the positive side in the X-axis direction (in this example, from the right side). The rotation angle of the first clamp 65 of 270° refers to that the first clamp 65 is rotated by 90° counterclockwise from the rotation position of the first clamp in step S802 as seen from the positive side in the X-axis direction.

Next, in step S805, the third measurement point detection processor 323 detects a third measurement point A_P1_Z (see FIG. 14) when the rotation angle of the first clamp 65 is 270°. The sixth measurement point detection processor 333 detects a sixth measurement point A_P2_Z (see FIG. 14) when the rotation angle of the first clamp 65 is 270°. As shown in FIG. 23, the "third measurement point A_P1_Z" is a point that is on the outer circumferential surface of the detection jig 4 and has an X coordinate same as that of the first reference point A_P1, that of the first measurement point A_P1_Y1, and that of the second measurement point A_P1_Y2. As shown in FIG. 24, the "sixth measurement point A_P2_Z" is a point that is on the outer circumferential surface of the detection jig 4 and has an X coordinate same as that of the second reference point A_P2, that of the fourth measurement point A_P2_Y1, and that of the fifth measurement point A_P2_Y2. As shown in FIG. 15, the third measurement point A_P1_Z and the sixth measurement point A_P2_Z are each at an end of the detection jig 4 on the positive side of the Z-axis direction, and are each the uppermost point of the detection jig 4.

In this preferred embodiment, the third measurement point detection processor 323 moves the detection tool 7 grasped by the grasper 42 to a position above the detection jig 4 held between the first clamp 65 and the second clamp 67. The third measurement point detection processor 323 controls the movement mechanism 90 such that the detection tool 7 grasped by the grasper 42 contacts the outer circumferential surface of the detection jig at the designed X coordinate of the third measurement point A_P1_Z from above the detection jig 4. At this point, the third measurement point detection processor 323 sets the Z coordinate of the detection tool 7 when the detection tool 7 contacts the outer circumferential surface of the detection jig 4 as the actual Z coordinate of the third measurement point A_P1_Z. A portion of the detection jig 4 that contacts the detection tool 7 at the third measurement point A_P1_Z when the rotation angle of the first clamp 65 is 270°, and a portion of the detection jig 4 that contacts the detection tool 7 at the first measurement point A_P1_Y1 when the rotation angle of the first clamp 65 is 0°, are the same as each other.

Similarly, the sixth measurement point detection processor 333 moves the detection tool 7 grasped by the grasper 42 to a position above the detection jig 4 held between the first clamp 65 and the second clamp 67. The sixth measurement point detection processor 333 controls the movement mechanism 90 such that the detection tool 7 grasped by the grasper 42 contacts the outer circumferential surface of the detection jig 4 at the designed X coordinate of the sixth measurement point A_P2_Z from above the detection jig 4. At this point, the sixth measurement point detection processor 333 sets the Z coordinate of the detection tool 7 when the detection tool 7 contacts the outer circumferential surface of the detection jig 4 as the actual Z coordinate of the sixth measurement point A_P2_Z. A portion of the detection jig 4 that contacts the detection tool 7 at the sixth measurement point A_P2_Z when the rotation angle of the first clamp 65 is 270°, and a portion of the detection jig 4 that contacts the detection tool 7 at the fourth measurement point A_P2_Y1 when the rotation angle of the first clamp 65 is 0°, are the same as each other.

As described above, each of the measurement points are calculated. After this, in step S806 in FIG. 25, an X coordinate, a Y coordinate and a Z coordinate of each of the first reference point A_P1 and the second reference point A_P2 are calculated. In this example, first, calculation of the first reference point A_P1 will be described. The first reference point X calculation processor 324 sets the X coordinate of the first measurement point A_P1_Y1 as the actual X coordinate of the first reference point A_P1. Alternatively, the first reference point X calculation processor 324 may set the X coordinate of the second measurement point A_P1_Y2 as the actual X coordinate of the first reference point A_P1.

Where the Y coordinate of the first reference point A_P1 is $A\_P1y$, the Y coordinate of the first measurement point A_P1_Y1 is $A\_P1\_Y1y$, and the Y coordinate of the second measurement point A_P1_Y2 is $A\_P1\_Y2y$, the first reference point Y calculation processor 325 calculates the Y coordinate of the first reference point A_P1 by the following expression (12).

$$A\_P1y = (A\_P1\_Y1y + A\_P1\_Y2y)/2 \qquad (12)$$

Where the Z coordinate of the first reference point A_P1 is $A\_P1z$, the Z coordinate of the third measurement point A_P1_Z is $A\_P1\_Zz$, and the diameter of the detection jig 4 is W, the first reference point Z calculation processor 326 calculates the Z coordinate of the first reference point A_P1 by the following expression (13).

$$A\_P1z = A\_P1\_Zz - W/2 \qquad (13)$$

The diameter W of the detection jig 4 is calculated from a difference between the Y coordinate of the first measurement point A_P1_Y1 and the Y coordinate of the second measurement point A_P1_Y2. In other words, the diameter W of the detection jig 4 is the distance between the first measurement point A_P1_Y1 and the second measurement point A_P1_Y2. Alternatively, the diameter W of the detection jig 4 may be calculated from a difference between the Y coordinate of the fourth measurement point A_P2_Y1 and the Y coordinate of the fifth measurement point A_P2_Y2. The diameter W of the detection jig 4 is also the distance between the fourth measurement point A_P2_Y1 and the fifth measurement point A_P2_Y2.

Now, calculation of the second reference point A_P2 will be described. The second reference point X calculation processor 334 sets the X coordinate of the fourth measurement point A_P2_Y1 as the actual X coordinate of the second reference point A_P2. Alternatively, the second reference point X calculation processor 334 may set the X coordinate of the fifth measurement point A_P2_Y2 as the actual X coordinate of the second reference point A_P2. Where the Y coordinate of the second reference point A_P2 is A_P2y, the Y coordinate of the fourth measurement point A_P2_Y1 is A_P2_Y1y, and the Y coordinate of the fifth measurement point A_P2_Y2 is A_P2_Y2y, the second reference point Y calculation processor 335 calculates the Y coordinate of the second reference point A_P2 by the following expression (14).

$$A\_P2y=(A\_P2\_Y1y+A\_P2\_Y2y)/2 \quad (14)$$

Where the Z coordinate of the second reference point A_P2 is A_P2z, the Z coordinate of the sixth measurement point A_P2_Z is A_P2_Zz, and the diameter of the detection jig 4 is W, the second reference point Z calculation processor 336 calculates the Z coordinate of the second reference point A_P2 by the following expression (15).

$$A\_P2z=A\_P2\_Zz-W/2 \quad (15)$$

To calculate the XYZ coordinates of each of the first reference point A_P1 and the second reference point A_P2, the eccentric offset (eccentric X offset and eccentric Y offset) calculated by the eccentric offset calculation processor 282 may be used to make a correction. Thus, the XYZ coordinates of the each of the first reference point A_P1 and the second reference point A_P2 are calculated.

As described above, the XYZ coordinates of each of the first reference point A_P1 and the second reference point A_P2 are calculated in step S503 in FIG. 20, so that the actual position of the first reference point A_P1 and the actual position of the second reference point A_P2 are calculated. After this, in step S504 in FIG. 20, the rotation axis offset calculation processor 288 calculates a rotation axis actual position, which is an actual position of the rotation axis R1 of the rotation mechanism 60, based on the actual positions of the first reference point A_P1 and the second reference point A_P2 calculated in step S503. The rotation axis actual position is an inclination of the rotation axis R1. The rotation axis offset calculation processor 288 compares the rotation axis actual position and the rotation axis designed position stored on the storage 281 to calculate the rotation axis offset, which is a correction value on the rotation axis R1.

As described above, the rotation axis offset is calculated. After this, to perform cutting, the movement control processor 289 (see FIG. 17) controls the movement mechanism 90 based on the rotation axis offset to move the grasper 42. Since the movement mechanism 90 is controlled in consideration of the shift of the rotation axis R1 of the rotation mechanism 60, the processing target 5 is cut into a desired shape.

In this preferred embodiment, as in step S505 in FIG. 20, the rotation amount correction processor 287 may correct the rotation amount of the first clamp 65. There may be a case where, for example, even though the first clamp 65 is designed to be rotated by 180°, the rotation angle of the first clamp 65 may be actually smaller or larger than 180°. In such a case, the rotation amount of the first clamp 65 is corrected such that when the first clamp 65 is designed to be rotated by 180°, the first clamp 65 is actually rotated by 180°. In this example, the rotation amount correction processor 287 executes the procedure shown in the flowchart of FIG. 26 to correct the rotation amount of the first clamp 65. In this preferred embodiment, as shown in FIG. 18, the rotation amount correction processor 287 includes a third clamp reference point detection processor 341, a fourth clamp reference point detection processor 342, a second clamp inclination calculation processor 343, and a clamp rotation amount correction processor 344.

Figure 27:
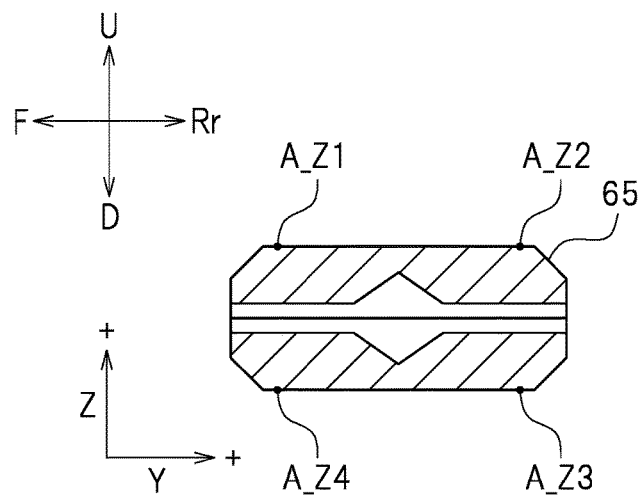
FIG. 27 is a cross-sectional view of the first clamp taken along line XXVII-XXVII in FIG. 14.

The storage 281 has, stored thereon in advance, a second clamp designed inclination, which is a designed inclination of the top surface of the first clamp 65 when the rotation angle of the first clamp 65 is 180° with respect to the first rotation reference position. FIG. 27 is a cross-sectional view of the first clamp 65 taken along line XXVII-XXVII in FIG. 14. FIG. 27 shows the cross-sectional view of the first clamp 65 when the rotation angle of the first clamp 65 is 0°. The top surface of the first clam 65 when the rotation angle thereof of 180° is the bottom surface of the first clamp 65 when the rotation angle thereof is 0°. In this preferred embodiment, the second clamp designed inclination is perpendicular to the Z-axis direction.

Figure 26:
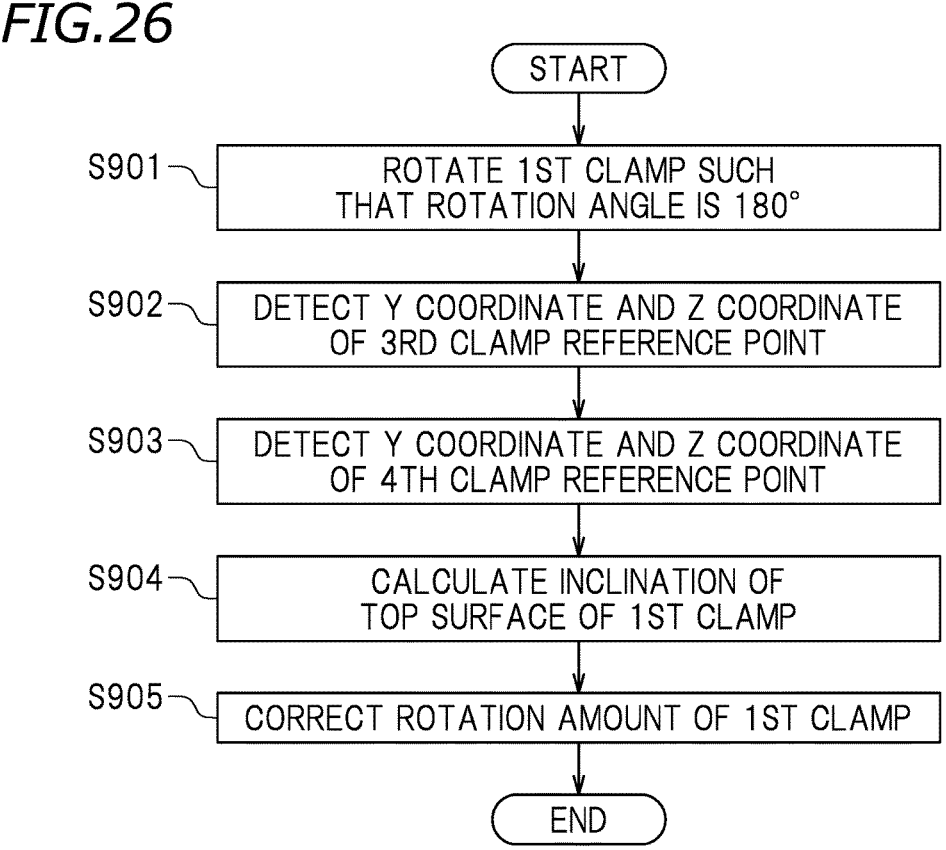
FIG. 26 is a flowchart showing a procedure to correct a rotation amount of the first clamp.

In step S901 in FIG. 26, the clamp rotation processor 284 rotates the first clamp 25 such that the rotation angle of the first clamp 65 is 180°. In this example, the clamp rotation processor 284 rotates the first clamp 25 by 270° counterclockwise from the rotation angle of the first clamp 65 in step S804 in FIG. 25 (specifically, 270°) as seen from the positive side in the X-axis direction (in this example, from the right side).

Next, in step S902 in FIG. 26, the third clamp reference point detection processor 341 detects a third clamp reference point A_Z3 (see FIG. 27). In step S903, the fourth clamp reference point detection processor 342 detects a fourth clamp reference point A_Z4 (see FIG. 27). As shown in FIG. 27, the third clamp reference point A_Z3 and the fourth clamp reference point A_Z4 are set on the top surface of the first clamp 65 when the rotation angle thereof is 180° (in other words, the bottom surface of the first clamp 65 when the rotation angle thereof is 0°). The third clamp reference point A_Z3 and the fourth clamp reference point A_Z4 are arrayed in the front-rear direction Y and have the same X coordinate as each other. In this preferred embodiment, as seen in a plan view, the third clamp reference point A_Z3 matches the second clamp reference point A_Z2. As seen in a plan view, the fourth clamp reference point A_Z4 matches the first clamp reference point A_Z1.

In step S902 in FIG. 26, the third clamp reference point detection processor 341 detects a Y coordinate and a Z coordinate of the third clamp reference point A_Z3. In this example, the third clamp reference point detection processor 341 controls the movement mechanism 90 such that the detection tool 7 grasped by the grasper 42 contacts the third clamp reference point A_Z3 of the first clamp 65 from above the first clamp 65 when the rotation angle of the first clamp 65 is 180°. At this point, the third clamp reference point detection processor 341 detects a Y coordinate and a Z coordinate of the tip of the detection tool 7 when the third clamp reference point A_Z3 contacts the detection tool 7, as the Y coordinate and the Z coordinate of the third clamp reference point A_Z3 respectively. In this example, the Y coordinate of the third clamp reference point A_Z3 when the rotation angle of the first clamp 65 is 180° will be referred to as a "third clamp Y coordinate". The Z coordinate of the third clamp reference point A_Z3 when the rotation angle of the first clamp 65 is 180° will be referred to as a "third clamp Z coordinate".

Next, in step S903 in FIG. 26, referring to FIG. 14, the fourth clamp reference point detection processor 342 detects a Y coordinate and a Z coordinate of the fourth clamp reference point A_Z4 when the rotation angle of the first clamp 65 is 180°. In this example, the fourth clamp reference point detection processor 342 controls the movement mechanism 90 such that the detection tool 7 grasped by the grasper 42 contacts the fourth clamp reference point A_Z4 of the first clamp 65 from above the first clamp 65 when the rotation angle of the first clamp 65 is 180°. At this point, the fourth clamp reference point detection processor 342 detects a Y coordinate and a Z coordinate of the tip of the detection tool 7 when the fourth clamp reference point A_Z4 contacts the detection tool 7, as the Y coordinate and the Z coordinate of the fourth clamp reference point A_Z4 respectively. In this example, the Y coordinate of the fourth clamp reference point A_Z4 when the rotation angle of the first clamp 65 is 180° will be referred to as a "fourth clamp Y coordinate". The Z coordinate of the fourth clamp reference point A_Z4 when the rotation angle of the first clamp 65 is 180° will be referred to as a "fourth clamp Z coordinate".

Next, in step S904 in FIG. 26, the second clamp inclination calculation processor 343 calculates a second clamp actual inclination, which is an actual inclination of the top surface of the first clamp 65 when the rotation angle thereof is 180°. The second clamp inclination calculation processor 343 uses the third clamp Y coordinate, the third clamp Z coordinate, the fourth clamp Y coordinate and the fourth clamp Z coordinate detected in steps S902 and S903 to calculate the second clamp actual inclination. In this preferred embodiment, the second clamp actual inclination is an inclination of a line connecting the third clamp reference point A_Z3 and the fourth clamp reference point A_Z4 on a YZ plane.

In this preferred embodiment, where the second clamp actual inclination is SL2, the third clamp Y coordinate is A_Z3y, the third clamp Z coordinate is A_Z3z, the fourth clamp Y coordinate is A_Z4y, and the fourth clamp Z coordinate is A_Z4z, the second clamp inclination calculation processor 343 calculates the second clamp actual inclination SL2 by the following expression (16). The unit of the clamp second actual inclination SL2 is rad. There is no specific limitation on the unit of the second clamp actual inclination SL2.

$$SL2 = \tan^{-1} \frac{A\_Z3z - A\_Z4z}{A\_Z4y - A\_Z3y} \quad (16)$$

Next, in step S905 in FIG. 26, the clamp rotation amount correction processor 344 corrects the rotation amount of the first clamp 65. In this example, the clamp rotation amount correction processor 344 corrects the rotation amount of the first clamp 65, such that the second clamp actual inclination calculated in step S904 is the second clamp designed inclination stored on the storage 281. As a result, when the first clamp 65 is designed to be rotated by 180°, the first clamp 65 is actually rotated by 180°.

In this preferred embodiment, the positions of the third clamp reference point A_Z3 and the fourth clamp reference point A_Z4 on the top surface of the first clamp 65 when the rotation angle thereof is 180° (in other words, the bottom surface of the first clamp 65 when the rotation angle thereof is 0°) are detected. The second clamp inclination calculation processor 343 calculates the inclination of the straight line connecting the third clamp reference point A_Z3 and the fourth clamp reference point A_Z4, and thus calculates the actual inclination of the first clamp 65 when the rotation angle thereof is 180°. In this manner, the two points of the third clamp reference point A_Z3 and the fourth clamp reference point A_Z4 are detected, so that the actual inclination of the first clamp 65 when the rotation angle thereof is 180° is easily calculated.

In this preferred embodiment, as shown in FIG. 23 and FIG. 24, the actual position of the first reference point A_P1 on the rotation axis R1 of the rotation mechanism 60 and the actual position of the second reference point A_P2 on the rotation axis R1 are detected. From the two points of the first reference point A_P1 and the second reference point A_P2, the actual inclination, or other position, of the rotation axis R1 of the rotation mechanism 60 is obtained. Therefore, the assembling error of the rotation mechanism 60, and the rotation axis offset, which is a correction value on the rotation axis R1, are calculated from the first reference point A_P1 and the second reference point A_P2. The movement mechanism 90 is controlled in consideration of the rotation axis offset, so that even if the rotation axis R1 of the rotation mechanism 60 is shifted, the grasper 42 of the cutting head 40 is moved three-dimensionally with respect to the rotation mechanism 60 in consideration of the shift. As a result, even if an assembling error of the rotation mechanism 60 occurs, the processing target 5 is cut into a desired shape.

In this preferred embodiment, the inclination adjustment processor 283 adjusts the inclination of the first clamp 65 when the rotation angle thereof is 0°. For example, there may be a case where although the rotation angle of the first clamp 65 is designed to be 0°, the actual rotation angle of the first clamp 65 is not 0° due to an assembling error of the rotation mechanism 60. In such a case, the inclination adjustment processor 283 adjusts the inclination of the first clamp 65 in order to make the actual rotation angle of the first clamp 65 0°, so that the inclination of the first clamp when the rotation angle thereof is 0° is made the same as the designed inclination thereof.

In this preferred embodiment, referring to FIG. 14, the positions of the first clamp reference point A_Z1 and the second clamp reference point A_Z2 on the top surface of the first clamp 65 when the rotation angle thereof is 0° are detected. The clamp inclination calculation processor 313 calculates the inclination of the straight line connecting the first clamp reference point A_Z1 and the second clamp reference point A_Z2 to each other, and thus calculates the actual inclination of the first clamp 65 when the rotation angle thereof is 0°. In this manner, the two points of the first clamp reference point A_Z1 and the second clamp reference point A_Z2 are detected, so that the actual inclination of the first clamp 65 is easily calculated.

As shown in FIG. 23, the first reference point A_P1 on the rotation axis R1 is located inside the detection jig 4. Therefore, the first reference point A_P1 is not directly detectable by the detection tool 7. Thus, in this preferred embodiment, the first measurement point A_P1_Y1, the second measurement point A_P1_Y2 and the third measurement point A_P1_Z, which are on the outer circumferential surface of the detection jig 4 and have the same X coordinate as that of the first reference point A_P1, are detected. Therefore, the first reference point A_P1 inside the detection jig 4 is detected from the first measurement point A_P1_Y1, the second measurement point A_P1_Y2 and the third measurement point A_P1_Z.

As shown in FIG. 24, the second reference point A_P2 on the rotation axis R1 is located inside the detection jig 4. Therefore, the second reference point A_P2 is not directly detectable by the detection tool 7. In this preferred embodiment, the fourth measurement point A_P2_Y1, the fifth measurement point A_P2_Y2 and the sixth measurement point A_P2_Z, which are on the outer circumferential surface of the detection jig 4 and have the same X coordinate as that of the second reference point A_P2, are detected. Therefore, the second reference point A_P2 inside the detection jig 4 is detected from the fourth measurement point A_P2_Y1, the fifth measurement point A_P2_Y2 and the sixth measurement point A_P2_Z.

In this preferred embodiment, the eccentric offset calculation processor 282 calculates the eccentric offset. The rotation axis offset calculation processor 288 calculates the rotation axis offset from the first reference point A_P1 and the second reference point A_P2 detected based on the eccentric offset. Thus, even if the grasper 42 does not properly grasp the detection tool 7, the eccentric offset is calculated to correct the orientation of the detection tool 7 grasped by the grasper 42, so that the first reference point A_P1 and the second reference point A_P2 are properly detected. As a result, the rotation axis offset is obtained more properly.

The terms and expressions used herein are for description only and are not to be interpreted in a limited sense. These terms and expressions should be recognized as not excluding any equivalents to the elements shown and described herein and as allowing any modification encompassed in the scope of the claims. The present invention may be embodied in many various forms. This disclosure should be regarded as providing preferred embodiments of the principles of the present invention. These preferred embodiments are provided with the understanding that they are not intended to limit the present invention to the preferred embodiments described in the specification and/or shown in the drawings. The present invention is not limited to the preferred embodiments described herein. The present invention encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or used during the prosecution of the present application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A cutting device, comprising:
a main body;
a cutting head including a grasper capable of grasping either a processing tool or a detection tool;
a magazine provided in the main body, the magazine including:
a magazine main body;
a stocker accommodating either the processing tool or the detection tool;
a tool sensor provided in the magazine main body, the tool sensor detecting either the processing tool or the detection tool that is grasped by the grasper; and
a first protrusion and a second protrusion provided on a top surface of the magazine main body;
a movement mechanism moving the grasper three-dimensionally with respect to the magazine; and
a controller controlling the movement mechanism; wherein the controller includes:
a first reference point detection processor controlling the movement mechanism such that the detection tool grasped by the grasper contacts the first protrusion, and detecting an actual position of a first reference point, which is a center point of a top surface of the first protrusion;
a second reference point detection processor controlling the movement mechanism such that the detection tool grasped by the grasper contacts the second protrusion, and detecting an actual position of a second reference point, which is a center point of a top surface of the second protrusion;
a sensor offset calculation processor calculating a sensor offset, which is a correction value on an actual position of the tool sensor with respect to a designed position of the tool sensor, based on the first reference point and the second reference point;
a stocker offset calculation processor calculating a stocker offset, which is a correction value on an actual position of the stocker with respect to a designed position of the stocker, based on the first reference point and the second reference point; and
a movement control processor controlling the movement mechanism based on the sensor offset and the stocker offset.

2. The cutting device according to claim 1, wherein:
the first reference point is represented by a coordinate in an XYZ orthogonal coordinate system; and
the first reference point detection processor includes:
a first measurement point detection processor detecting a first measurement point, which is a point on an outer circumferential surface of the first protrusion;
a second measurement point detection processor detecting a second measurement point, which is a point on the outer circumferential surface of the first protrusion and has a Y coordinate same as a Y coordinate of the first measurement point and an X coordinate different from an X coordinate of the first measurement point;
a third measurement point detection processor detecting a third measurement point, which is a point on the outer circumferential surface of the first protrusion and has, as an X coordinate, an X coordinate of a median point between the X coordinate of the first measurement point and the X coordinate of the second measurement point;
a fourth measurement point detection processor detecting a fourth measurement point, which is a point on the outer circumferential surface of the first protrusion and has an X coordinate same as the X coordinate of the third measurement point and a Y coordinate different from a Y coordinate of the third measurement point;
a first reference point X calculation processor setting an X coordinate of a median point between the X coordinate of the first measurement point and the X coordinate of the second measurement point as the X coordinate of the first reference point;
a first reference point Y calculation processor setting a Y coordinate of a median point between the Y coordinate of the third measurement point and the Y coordinate of the fourth measurement point as the Y coordinate of the first reference point; and
a first reference point Z detection processor controlling the movement mechanism such that the detection tool grasped by the grasper contacts a position that is on the top surface of the first protrusion and has, as an X coordinate, the X coordinate of the first reference point and, as a Y coordinate, the Y coordinate of the first reference point, and detecting the Z coordinate of the first reference point.

3. The cutting device according to claim 1, wherein:
the second reference point is represented by a coordinate in an XYZ orthogonal coordinate system; and
the second reference point detection processor includes:
a fifth measurement point detection processor detecting a fifth measurement point, which is a point on an outer circumferential surface of the second protrusion;
a sixth measurement point detection processor detecting a sixth measurement point, which is a point on the outer circumferential surface of the second protrusion and has a Y coordinate same as a Y coordinate of the fifth measurement point and an X coordinate different from an X coordinate of the fifth measurement point;
a seventh measurement point detection processor detecting a seventh measurement point, which is a point on the outer circumferential surface of the second protrusion and has, as an X coordinate, an X coordinate of a median point between the X coordinate of the fifth measurement point and the X coordinate of the sixth measurement point;
an eighth measurement point detection processor detecting an eighth measurement point, which is a point on the outer circumferential surface of the second protrusion and has an X coordinate same as the X coordinate of the seventh measurement point and a Y coordinate different from a Y coordinate of the seventh measurement point;
a second reference point X calculation processor setting an X coordinate of a median point between the X coordinate of the fifth measurement point and the X coordinate of the sixth measurement point as the X coordinate of the second reference point;
a second reference point Y calculation processor setting a Y coordinate of a median point between the Y coordinate of the seventh measurement point and the Y coordinate of the eighth measurement point as the Y coordinate of the second reference point; and
a second reference point Z detection processor controlling the movement mechanism such that the detection tool grasped by the grasper contacts a position that is on the top surface of the second protrusion and has, as an X coordinate, the X coordinate of the second reference point and, as a Y coordinate, the Y coordinate of the second reference point, and detecting the Z coordinate of the second reference point.

4. The cutting device according to claim 1, wherein:
the first reference point and the second reference point are each represented by a coordinate in an XYZ orthogonal coordinate system;
the sensor offset includes a sensor X offset as a sensor offset in an X-axis direction, a sensor Y offset as a sensor offset in a Y-axis direction, and a sensor Z offset as a sensor offset in a Z-axis direction;
the controller includes a storage that stores a designed X coordinate and a designed Y coordinate of the first reference point and a designed Z coordinate of a top surface of the tool sensor; and
the sensor offset calculation processor includes:
a sensor X offset calculation processor calculating the sensor X offset by an expression represented by:

$$E1x = M\_P1x - DM\_P1x$$

where the sensor X offset is E1$x$, the X coordinate of the first reference point is M_P1$x$, and the designed X coordinate of the first reference point is DM_P1$x$;
a sensor Y offset calculation processor calculating the sensor Y offset by an expression represented by:

$$E1y = M\_P1y - DM\_P1y$$

where the sensor Y offset is E1$y$, the Y coordinate of the first reference point is M_P1$y$, and the designed Y coordinate of the first reference point is DM_P1$y$; and
a sensor Z offset calculation processor causing the grasper to contact the tool sensor from above the tool sensor to detect an actual Z coordinate of the tool sensor and calculating the sensor Z offset by an expression represented by:

$$E1z = TSz - DTSz$$

where the sensor Z offset is E1$z$, the actual Z coordinate of the tool sensor is TS$z$, and the designed Z coordinate of the tool sensor is DTS$z$.

5. The cutting device according to claim 4, wherein:
the stocker offset includes a stocker X offset as a stocker offset in an X-axis direction, a stocker Y offset as a stocker offset in a Y-axis direction, and a stocker Z offset as a stocker offset in a Z-axis direction;
the storage stores a distance from the first reference point to the stocker and a designed X coordinate of the second reference point; and
the stocker offset calculation processor includes:
a stocker X offset calculation processor calculating the stocker X offset by an expression represented by:

$$E2x = (M\_P1x + ((M\_P2x - M\_P1x)/(DM\_P2x - DM\_P1x)) \times D) - (DM\_P1x + D)$$

where the stocker X offset is E2$x$, the X coordinate of the second reference point is M_P2$x$, the designed X coordinate of the second reference point is DM_P2$x$, and the distance from the first reference point to the stocker is D;
a stocker Y offset calculation processor calculating the stocker Y offset by an expression represented by:

$$E2y = (M\_P1y + ((M\_P2y - M\_P1y)/(M\_P2x - M\_P1x)) \times D) - DM\_P1y$$

where the stocker Y offset is E2$y$, and the Y coordinate of the second reference point is M_P2$y$; and
a stocker Z offset calculation processor calculating the stocker Z offset by an expression represented by:

$$E2z = (M\_P1z + ((M\_P2z - M\_P1z)/(M\_P2x - M\_P1x)) \times D) - DM\_P1z$$

where the stocker Z offset is E2$z$, and the Z coordinate of the second reference point is M_P2$z$.

6. The cutting device according to claim 1, wherein:
the cutting head includes a spindle rotating the grasper about a rotation axis;
for the spindle, a rotation reference position, which is a reference position to rotate the grasper, is set;
the controller includes an eccentric offset calculation processor calculating an eccentric offset, which is a position difference between the detection tool grasped by the grasper when the spindle is rotated such that the rotation angle of the spindle is 0° with respect to the rotation reference position, and the detection tool grasped by the grasper when the spindle is rotated such that the rotation angle of the spindle is 180° with respect to the rotation reference position;

the sensor offset calculation processor calculates the sensor offset based on the eccentric offset; and the stocker offset calculation processor calculates the stocker offset based on the eccentric offset.

7. The cutting device according to claim 6, wherein:

the eccentric offset is represented by a coordinate in an XYZ orthogonal coordinate system;

the eccentric offset includes an eccentric X offset as an eccentric offset in an X-axis direction, and an eccentric Y offset as an eccentric offset in a Y-axis direction; and the eccentric offset calculation processor includes:

a first spindle rotation processor rotating the spindle such that the rotation angle of the spindle is 0° with respect to the rotation reference position;

a first angle X detection processor detecting, when the rotation angle of the spindle is 0°, a first eccentric X coordinate, which is a point on an outer circumferential surface of the first protrusion and is an X coordinate of a ninth measurement point located at an end of the outer circumferential surface of the first protrusion in the X-axis direction;

a first angle Y detection processor detecting, when the rotation angle of the spindle is 0°, a first eccentric Y coordinate, which is a point on the outer circumferential surface of the first protrusion and is a Y coordinate of a tenth measurement point located at an end of the outer circumferential surface of the first protrusion in the Y-axis direction;

a second spindle rotation processor rotating the spindle such that the rotation angle of the spindle is 180° with respect to the rotation reference position;

a second angle X detection processor detecting, when the rotation angle of the spindle is 180°, a second eccentric X coordinate, which is the X coordinate of the ninth measurement point;

a second angle Y detection processor detecting, when the rotation angle of the spindle is 180°, a second eccentric Y coordinate, which is the Y coordinate of the tenth measurement point;

an eccentric X offset calculation processor setting a difference between the first eccentric X coordinate and the second eccentric X coordinate as the eccentric X offset; and an eccentric Y offset calculation processor setting a difference between the first eccentric Y coordinate and the second eccentric Y coordinate as the eccentric Y offset.

8. The cutting device according to claim 1, wherein the top surface of the first protrusion and the top surface of the second protrusion are at an equal level or a substantially equal level to each other.

9. The cutting device according to claim 1, wherein:

the position of the magazine with respect to the main body is represented by an XYZ orthogonal coordinate system; and the stocker, the tool sensor, the first protrusion and the second protrusion are arrayed in an X-axis direction.

10. The cutting device according to claim 1, wherein the stocker is located between the first protrusion and the second protrusion as seen in a plan view.

11. The cutting device according to claim 1, wherein the first protrusion and the second protrusion are circular or substantially circular as seen in a plan view.

* * * * *